(12) United States Patent
Ohnishi et al.

(10) Patent No.: US 7,385,321 B2
(45) Date of Patent: Jun. 10, 2008

(54) MOTOR HAVING SHIFTED TEETH OF PRESSED POWDER CONSTRUCTION

(75) Inventors: Kazuo Ohnishi, Gunma (JP); Shoji Ohiwa, Gunma (JP); Yasuaki Motegi, Gunma (JP)

(73) Assignee: Japan Servo Co., Ltd., Gunma (JP)

( * ) Notice: Subject to any disclaimer, the term of this patent is extended or adjusted under 35 U.S.C. 154(b) by 0 days.

(21) Appl. No.: 11/561,688

(22) Filed: Nov. 20, 2006

(65) Prior Publication Data

US 2007/0090699 A1  Apr. 26, 2007

Related U.S. Application Data

(62) Division of application No. 10/939,873, filed on Sep. 13, 2004.

(30) Foreign Application Priority Data

Sep. 22, 2003  (JP) ............... 2003-330338
Jul. 2, 2004  (JP) ............... 2004-197226

(51) Int. Cl.
*H02K 37/04* (2006.01)

(52) U.S. Cl. ............... 310/49 R; 310/156.64; 310/44; 310/181

(58) Field of Classification Search ............ 310/49 R, 310/156.64, 181, 166, 261, 44
See application file for complete search history.

(56) References Cited

U.S. PATENT DOCUMENTS

| | | | |
|---|---|---|---|
| 4,306,164 A * | 12/1981 | Itoh et al. | |
| 4,330,724 A | 5/1982 | Goddijn | |
| 4,488,069 A | 12/1984 | Field, II et al. | |
| 4,899,072 A * | 2/1990 | Ohta et al. | |
| 5,315,192 A * | 5/1994 | Satomi | |
| 5,708,310 A * | 1/1998 | Sakamoto et al. | |
| 5,719,452 A * | 2/1998 | Sugiura | |
| 5,723,921 A * | 3/1998 | Sugiura | |
| 5,834,865 A * | 11/1998 | Sugiura | |
| 5,856,714 A * | 1/1999 | Sugiura | |
| 6,441,530 B1 * | 8/2002 | Peterson | |
| 6,548,923 B2 * | 4/2003 | Ohnishi et al. | |
| 6,674,187 B2 * | 1/2004 | Isozaki et al. | ............ 310/49 R |

(Continued)

FOREIGN PATENT DOCUMENTS

EP  0568347  11/1993

(Continued)

*Primary Examiner*—Tamai I Karl
(74) *Attorney, Agent, or Firm*—Boyle Fredrickson S.C.

(57) ABSTRACT

A multi-polar rotary machine comprises a cylindrical outer rotor arranged concentrically with the stator and with an air gap therebetween. The stator has two spaced stator elements and a ring shaped permanent magnet held between the stator elements and magnetized so as to form N and S poles in the axial direction of the stator. Small axially separated stator teeth A and $\overline{A}$ and $\overline{B}$ and B are formed on the outer peripheral surface of the spaced stator elements. Stator windings for A phase and B phase are wound around the respective stator elements. The small stator teeth A, $\overline{A}$, $\overline{B}$ and B are circumferentially shifted from corresponding small rotor teeth by a ¼ pitch of the small stator teeth, respectively. Each of the stator and rotor is formed of pressed powder comprising a soft magnetic material at least one of a resin and an inorganic material.

7 Claims, 17 Drawing Sheets

U.S. PATENT DOCUMENTS

| | | |
|---|---|---|
| 6,731,027 B2 * | 5/2004 | Ohnishi et al. |
| 6,903,476 B2 * | 6/2005 | Sakamoto ............... 310/156.64 |
| 7,145,278 B2 * | 12/2006 | Sakamoto ............... 310/156.64 |
| 2001/0038249 A1 * | 11/2001 | Ohnishi et al. |
| 2005/0062348 A1 * | 3/2005 | Ohnishi et al. |
| 2005/0194846 A1 * | 9/2005 | Sakamoto ................. 310/49 R |

FOREIGN PATENT DOCUMENTS

| | | |
|---|---|---|
| EP | 0812054 | 12/1997 |
| EP | 1289102 | 3/2003 |
| JP | 54084207 | 7/1979 |
| JP | 56-10071 | 2/1981 |
| JP | 56012856 | 2/1981 |
| JP | 57-208854 | 12/1982 |
| JP | 57208854 | 12/1982 |
| JP | 62-126851 | 6/1987 |
| JP | 03112356 | 5/1991 |
| JP | 04140056 | 5/1992 |
| JP | 06165468 | 6/1994 |
| JP | 09056137 | 2/1997 |
| JP | 09233801 | 9/1997 |
| JP | 2003-70222 | 3/2003 |
| JP | 2003-158863 | 8/2003 |

* cited by examiner

NUMBER OF SMALL TOOTH : 50

MOTOR HAVING SHIFTED TEETH OF PRESSED POWDER CONSTRUCTION

CROSS REFERENCE TO RELATED APPLICATION

This application is a divisional of U.S. patent application Ser. No. 10/939,873 filed on Sep. 13, 2004, the entire contents of which is hereby expressly incorporated by reference into the present application.

BACKGROUND OF THE INVENTION

1. Field of the Invention

The present invention relates to a multi-polar rotary machine, and more particularly, to a typical hybrid type stepping motor capable of increasing an output and reducing cogging torque for use in an office automation (OA) apparatus or a fully automatic (FA) equipment.

2. Description of the Prior Art

A variable• reluctance (VR) type stepping motor having a rotor using no permanent magnet, a permanent magnet (PM) type stepping motor having a rotor composed of a permanent magnet, and a hybrid (HB) type stepping motor formed by mixing the variable• reluctance type stepping motor and the permanent magnet type stepping motor have been proposed. The permanent magnet type stepping motor and the hybrid type stepping motor are capable of reducing in size and accordingly are used in a relatively small industrial machine. Especially, the hybrid type stepping motor is high in precision and torque and is small in step angle, and accordingly such motor is used widely. However, it is required for the motor to reduce in size and to increase in torque further.

In order to increase a torque, it is effective to increase magnetic flux interlinkaging a winding and a turn number of the winding. A stepping motor capable of increasing the magnetic flux interlinkaging the winding without reducing the resolution or the rotor tooth number is disclosed in the Japanese Patent Application Laid-Open No. 12856/81.

FIG. 26 is a vertically sectioned front view of a hybrid type motor having an outer rotor disclosed in the Japanese Patent Application Laid-Open No. 12856/81. In FIG. 26, a reference numeral 1 denotes a stationary shaft, 2 denotes a front cover, 2' denotes a rear cover, and 3 denotes a ring shaped magnet magnetized so as to form N and S poles in the axial direction thereof, the magnet 3 being fixed to the stationary shaft 1 passing through a center portion of the magnet 3. Reference numerals 4, 5 denote cylindrical stator elements forming a stator 6 fixed to the shaft 1 corresponding to A phase and B phase, respectively. The stator element 4 has on an outer peripheral surface thereof a plurality of small stator teeth A and $\overline{A}$ separated from each other in the axial direction thereof, the small stator teeth $\overline{A}$ being brought into contact with one side surface of the magnet 3. The stator element 5 has on an outer peripheral surface thereof a plurality of small stator teeth $\overline{B}$ and B separated from each other in the axial direction thereof, the small stator teeth $\overline{B}$ being brought into contact with the other side surface of the magnet 3.

A reference numeral 8 denotes an annular groove formed on a peripheral surface at a central portion of the stator element 4, 9 denotes an annular groove formed on a peripheral surface at a central portion of the stator element 5, 12 denotes an exciting winding arranged in the annular groove 8, and 13 denotes an exciting winding arranged in the annular groove 9.

A reference numeral 10 denotes a cylindrical rotor supported rotatably by the shaft 1 through bearings 11 and 11 and covers 2 and 2'. An inner peripheral surface of the rotor 10 faces to an outer peripheral surface of the stator 6 with an air gap therebetween, and has a plurality of small rotor teeth similar in number to the small stator teeth of the stator element 4 or 5.

As shown in FIG. 26A and FIG. 26B, the small stator teeth $\overline{A}$ is circumferentially shifted from the small stator teeth A by 0.5 pitch of the small stator teeth. As shown in FIG. 26C and FIG. 26D, the small stator teeth B is circumferentially shifted from the small stator teeth A by 0.25 pitch of the small stator teeth, and the small stator teeth $\overline{B}$ is circumferentially shifted from the small stator teeth A by 0.75 pitch of the small stator teeth.

In the above case, the small stator teeth A, B, $\overline{A}$, and $\overline{B}$ are circumferentially shifted by 0.25 pitch of the small stator teeth, respectively. In the other case, the small stator teeth are not circumferentially shifted, but the small rotor teeth corresponding to the small stator teeth are circumferentially shifted by 0.25 pitch of the small rotor teeth.

A current flow of the magnetic flux will now be explained. As shown in FIG. 28, a magnetic flux issued from the magnet 3 is entered into the stator element 4, and divided into a magnetic flux $\phi_A$ passing through the small stator teeth A and a magnetic flux $\phi_{\overline{A}}$ passing though the small stator teeth $\overline{A}$. The magnetic fluxes $\phi_A$ and $\phi_{\overline{A}}$ are entered into the rotor 10, directed rightward, and divided into a magnetic flux $\phi_B$ passing through the small stator teeth B and a magnetic flux $\phi_{\overline{B}}$ passing through the small stator teeth $\overline{B}$. The magnetic fluxes $\phi_B$ and $\phi_{\overline{B}}$ are directed leftward, and returned to the magnet 3.

The magnetic fluxes $\phi_A$, $\phi_{\overline{A}}$, $\phi_B$ and $\phi_{\overline{B}}$ can be expressed by Formulas 1 to 4, respectively.

$$\phi_A = \Phi_A(1 + k \cos \theta) \tag{1}$$

$$\phi_{\overline{A}} = \Phi_{\overline{A}}(1 - k' \cos \theta) \tag{2}$$

$$\phi_B = \Phi_B(1 + k \sin \theta) \tag{3}$$

$$\phi_{\overline{B}} = \Phi_{\overline{B}}(1 - k' \sin \theta) \tag{4}$$

Here, θ denotes an electrical angle of the rotation of rotor 10, $\Phi_A$, $\Phi_{\overline{A}}$, $\Phi_B$ and $\Phi_{\overline{B}}$ are mean values of variable magnetic fluxes $\phi_A$, $\phi_{\overline{A}}$, $\phi_B$ and $\phi_{\overline{B}}$, respectively, and k and k' are rate of variation. As shown in FIG. 26, the A phase and the B phase are bisymmetric with respect to the magnet except the phase relation, so that $\Phi_A = \Phi_B$, $\Phi_{\overline{A}} = \Phi_{\overline{B}}$ and k=k'. Here, it is assumed that the magnetic flux is varied as a sine wave by omtting the harmonic components thereof for the sake of simplicity.

As shown in the Formulas 1 to 4, the magnetic fluxes $\phi_A$, $\phi_B$, $\phi_{\overline{A}}$ and $\phi_{\overline{B}}$ are deviated, respectively, in phase by electrical angle of 90° in this order.

The generated torque is analyzed as follows.

As shown in FIG. 28, effective main magnetic fluxes interlinkaging the windings 12 and 13 for exciting the A phase and the B phase, respectively, are the magnetic fluxes $\phi_A$ and $\phi_B$, respectively. In case that the rotor 10 is rotated at an electrical angular velocity of ω, counter electromotive forces $e_A$ and $e_B$ can be expressed by Formulas 5 and 6. Here, n denotes a number of winding of each phase.

$$e_A = -n\frac{d\phi_A}{dt} = n\Phi k\omega \sin\theta \tag{5}$$

$$e_B = -n\frac{d\phi_B}{dt} = n\Phi k\omega \cos\theta \tag{6}$$

A torque $T_A$ and a torque $T_B$ can be expressed by Formulas 7 and 8.

$$T_A = e_A i/\omega_M = ni\Phi kp \sin\theta \qquad (7)$$

$$T_B = e_B i/\omega_M = ni\Phi kp \cos\theta \qquad (8)$$

Here, $\omega_M$ denotes a mechanical angular velocity and is $\omega/p$, and p denotes a pole pair number, that is, a number of the small stator teeth or small rotor teeth.

It is appreciated that a mean magnetic flux $\Phi$ interlinkaging the winding and a rate of variation k must be increased in order to increase the torque if the number of windings and the number of the small teeth are constant.

In general, each of the rotor and the stator of the motor is formed by laminating a plurality of silicon steel plates, and each silicon steel plate is coated with an anti-corrosion film, so that a gap is formed between laminated silicon steel plates unavoidably. In the conventional motor, many paths of magnetic flux are formed in the axial direction of the motor, and the permeance of iron core is reduced by the gap between the laminated plates, so that the magnetic flux interlinkaging the winding is reduced. Especially, in the motor as shown in FIG. 28, effective main fluxes are only $\phi_A$ and $\phi_B$ and the magnetic fluxes $\phi_{\overline{A}}$ and $\phi_{\overline{B}}$ are all reactive components. The magnetic flux has a tendency to pass through a magnetic path of smaller magnetic reluctance, so that almost all magnetic fluxes issued from the magnet become $\phi_{\overline{A}}$ and $\phi_{\overline{B}}$ and the magnetic fluxes $\phi_A$ and $\phi_B$ become very small, and the torque shown in Formulas 5 and 6 is reduced, but the cogging torque is increased, in case of the motor using laminated steel plates.

FIG. 29 shows a waveform of counter electromotive force p of one phase of the conventional motor when it is rotated at 500 revolutions per minute. In this case, the magnitude of the induced voltage is 10V. In this motor, the induced voltage is decreased and the efficiency is lowered compared with the normal motor of similar dimension.

FIG. 30 shows a waveform of cogging torque r of the conventional motor. The magnitude of the cogging torque r is about 0.5 Nm and increased compared with the normal motor of similar dimension, thereby causing a large vibration in the motor when it is rotated.

SUMMARY OF THE INVENTION

Accordingly, an object of the present invention is to provide a motor wherein an output of the motor is increased by reducing the magnetic reluctance of the paths in the axial direction of the motor, and balancing magnetic paths of A, $\overline{A}$, $\overline{B}$ and B to one another so that the magnetic flux interlinkaging the winding is increased, and wherein the cogging torque of the motor is reduced.

Another object of the present invention is to provide a multi-polar rotary machine comprising a stator; and a cylindrical outer rotor arranged concentrically with the stator and with an air gap therebetween; said stator having two splitted stator elements and a ring shaped permanent magnet held between the stator elements and magnetized so as to form N and S poles in the axial direction of the stator, a plurality of small stator teeth A and $\overline{A}$ separated in the axial direction of the stator from each other and formed on the outer peripheral surface of one of the splitted stator elements, a plurality of small stator teeth $\overline{B}$ and B separated in the axial direction of the stator from each other and formed on the outer peripheral surface of the other of the splitted stator elements, and stator windings for A phase and B phase wound around the stator elements, respectively; said rotor having a plurality of small rotor teeth formed on the inner peripheral surface thereof similar in number to the small stator teeth; said small stator teeth A, $\overline{A}$, $\overline{B}$ and B being circumferentially shifted from said small rotor teeth by a ¼ pitch of the small stator teeth, respectively, wherein each of said stator and said rotor is formed of pressed powder consisting of soft magnetic material, and of resin and/or inorganic material.

Further object of the present invention is to provide a multi-polar rotary machine comprising a stator; and a cylindrical outer rotor arranged concentrically with the stator and with an air gap therebetween; said stator having two splitted stator elements and a ring shaped permanent magnet held between the stator elements and magnetized so as to form N and S poles in the axial direction of the stator, a plurality of small stator teeth A and $\overline{A}$ separated in the axial direction of the stator from each other and formed on the outer peripheral surface of one of the splitted stator elements, a plurality of small stator teeth $\overline{B}$ and B separated in the axial direction of the stator from each other and formed on the outer peripheral surface of the other of the splitted stator elements, and stator windings for A phase and B phase wound around the stator elements, respectively; said rotor having a plurality of small rotor teeth formed on the inner peripheral surface thereof similar in number to the small stator teeth, wherein each of said stator and said rotor is formed of pressed powder consisting of soft magnetic material, and of resin and/or inorganic material, and said small rotor teeth are arranged axisymmetrically with vernier pitch.

A further object of the present invention is to provide a multi-polar rotary machine comprising an inner rotor; and a cylindrical stator arranged concentrically with the rotor and with an air gap therebetween; said stator having two splitted stator elements and a ring shaped permanent magnet held between the stator elements and magnetized so as to form N and S poles in the axial direction of the stator, a plurality of small stator teeth A and $\overline{A}$ separated in the axial direction of the stator from each other and formed on the inner peripheral surface of one of the splitted stator elements, a plurality of small stator teeth $\overline{B}$ and B separated in the axial direction of the stator from each other and formed on the inner peripheral surface of the other of the splitted stator elements, and stator windings for A phase and B phase wound around the stator elements, respectively; said rotor having a plurality of small rotor teeth formed on the outer peripheral surface thereof similar in number to the small stator teeth; said small stator teeth A, $\overline{A}$, $\overline{B}$ and B being circumferentially shifted from said small rotor teeth by a ¼ pitch of the small stator teeth, respectively, wherein each of said stator and said rotor is formed of pressed powder consisting of soft magnetic material, and of resin and/or inorganic material.

Yet further object of the present invention is to provide a multi-polar rotary machine comprising an inner rotor; and a cylindrical stator arranged concentrically with the rotor and with an air gap therebetween; said stator having two splitted stator elements and a ring shaped permanent magnet held between the stator elements and magnetized so as to form N and S poles in the axial direction of the stator, a plurality of small stator teeth A and $\overline{A}$ separated in the axial direction of the stator from each other and formed on the inner peripheral surface of one of the splitted stator elements, a plurality of small stator teeth $\overline{B}$ and B separated in the axial direction of the stator from each other and formed on the inner peripheral surface of the other of the splitted stator elements, and stator windings for A phase and B phase wound around the stator elements, respectively; said rotor having a plurality of small rotor teeth formed on the outer peripheral surface thereof similar in number to the small stator teeth, wherein each of said stator and said rotor is formed of pressed powder consisting of soft magnetic material, and of resin and/or inorganic material, and said small rotor teeth are arranged axisymmetrically with vernier pitch.

Still further object of the present invention is to provide a multi-polar rotary machine comprising an inner rotor; and a cylindrical stator arranged concentrically with the rotor and with an air gap therebetween; said rotor having two splitted rotor elements and a ring shaped permanent magnet held between the rotor elements and magnetized so as to form N and S poles in the axial direction of the rotor; said stator having two splitted stator elements and a plurality of small stator teeth A and $\overline{A}$ separated in the axial direction of the stator from each other and formed on the inner peripheral surface of one of the splitted stator elements, a plurality of small stator teeth $\overline{B}$ and B separated in the axial direction of the stator from each other and formed on the inner peripheral surface of the other of the splitted stator elements, and stator windings for A phase and B phase wound around the stator elements, respectively; said rotor having a plurality of small rotor teeth formed on the outer peripheral surface thereof similar in number to the small stator teeth; said small stator teeth A, $\overline{A}$, $\overline{B}$ and B being circumferentially shifted from said small rotor teeth by a ¼ pitch of the small stator teeth, respectively, wherein each of said stator and said rotor is formed of pressed powder consisting of soft magnetic material, and of resin and/or inorganic material.

The other object of the present invention is to provide a multi-polar rotary machine comprising an inner rotor; and a cylindrical stator arranged concentrically with the rotor and with an air gap therebetween; said rotor having two splitted rotor elements and a ring shaped permanent magnet held between the rotor elements and magnetized so as to form N and S poles in the axial direction of the rotor; said stator having two splitted stator elements and a plurality of small stator teeth A and $\overline{A}$ separated in the axial direction of the stator from each other and formed on the inner peripheral surface of one of the splitted stator elements, a plurality of small stator teeth $\overline{B}$ and B separated in the axial direction of the stator from each other and formed on the inner peripheral surface of the other of the splitted stator elements, and stator windings for A phase and B phase wound around the stator elements, respectively; said rotor having a plurality of small rotor teeth formed on the outer peripheral surface thereof similar in number to the small stator teeth, wherein each of said stator and said rotor is formed of pressed powder consisting of soft magnetic material, and of resin and/or inorganic material, and said small rotor teeth are arranged axisymmetrically with vernier pitch.

A ratio of a thickness of the small stator teeth $\overline{A}$ in the axial direction of the stator to a thickness of the small stator teeth A in the axial direction of the stator is set to a value smaller than 1 so as to equalize substantially in mean permeance both small stator teeth A and $\overline{A}$ to each other, and wherein a ratio of a thickness of the small stator teeth $\overline{B}$ in the axial direction of the stator to a thickness of the small stator teeth B in the axial direction of the stator is set to a value smaller than 1 so as to equalize substantially in mean permeance both small stator teeth $\overline{B}$ and B to each other.

A ratio of a thickness of the small stator teeth $\overline{A}$ or $\overline{B}$ in the axial direction of the stator to a thickness of the small stator teeth A or B in the axial direction is set of 0.5 to 0.8.

A ratio of a stator tooth width to a rotor tooth width is set to 35% to 45% with respect to the standard small teeth pitch.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

DESCRIPTION OF THE PREFERRED EMBODIMENTS

Figure 26:
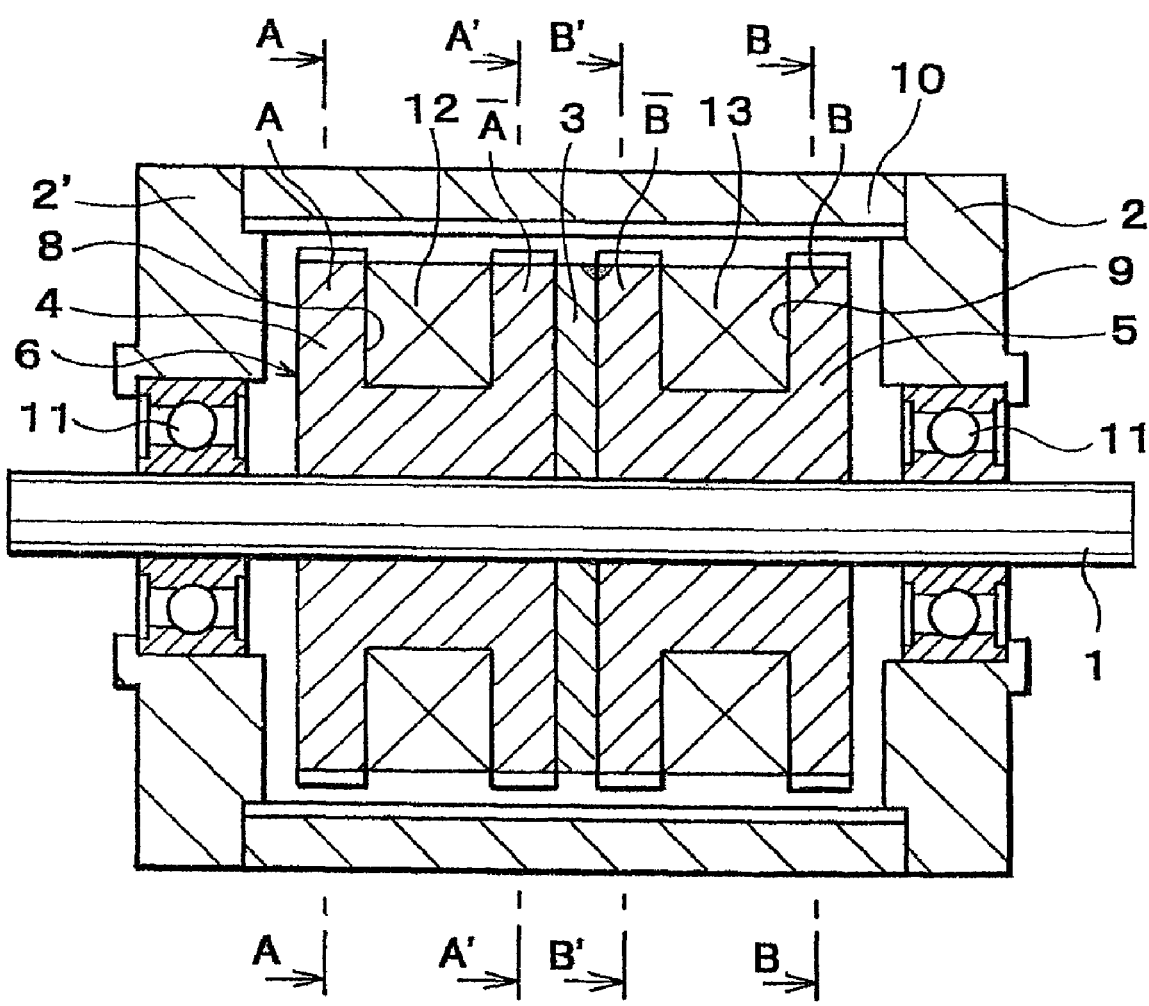
FIG. 26 is a vertically sectioned front view of an outer rotor type conventional two-phase hybrid stepping motor.
Figure 26A:
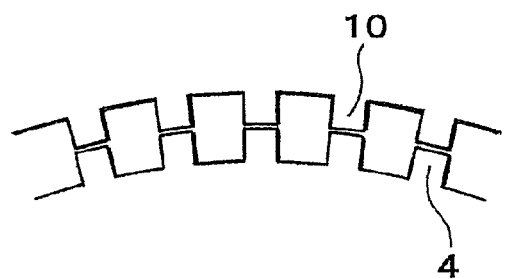
FIG. 26A is a sectional view taken on line of A-A of FIG. 26.
Figure 26B:
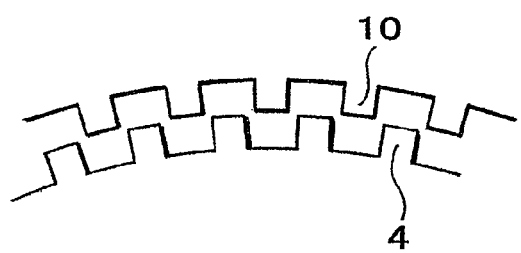
FIG. 26B is a sectional view taken on line of A'-A' of FIG. 26.
Figure 26C:
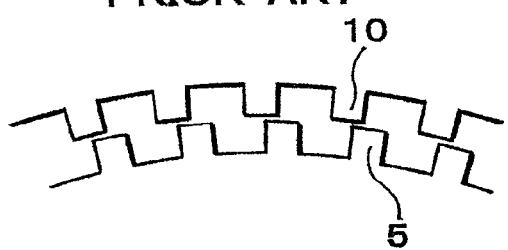
FIG. 26C is a sectional view taken on line of B-B of FIG. 26.
Figure 26D:
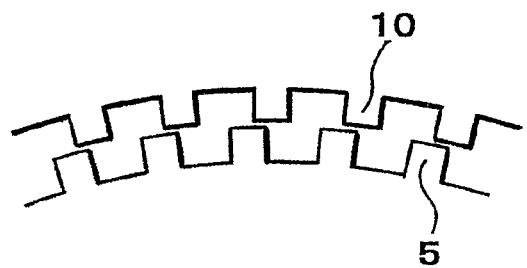
FIG. 26D is a sectional view taken on line of B'-B' of FIG. 26.
Figure 27:
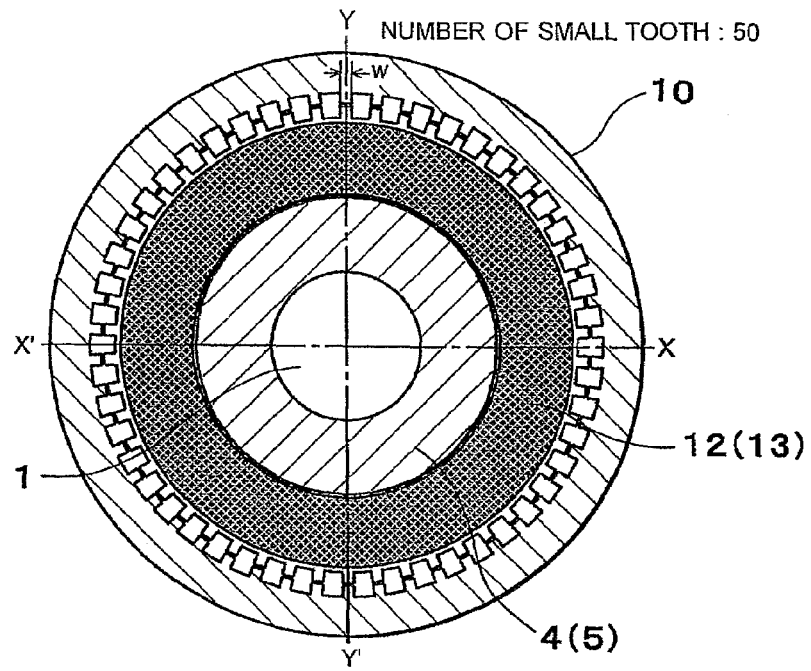
FIG. 27 is a vertically sectioned side view of the motor shown in FIG. 26.

A hybrid stepping motor of a first embodiment according to the present invention will be explained. Parts of the motor which are similar to corresponding parts of the conventional motor shown in FIG. 26 and FIG. 27 have been given corresponding reference numerals and need not be further redescribed.

Figure 1:
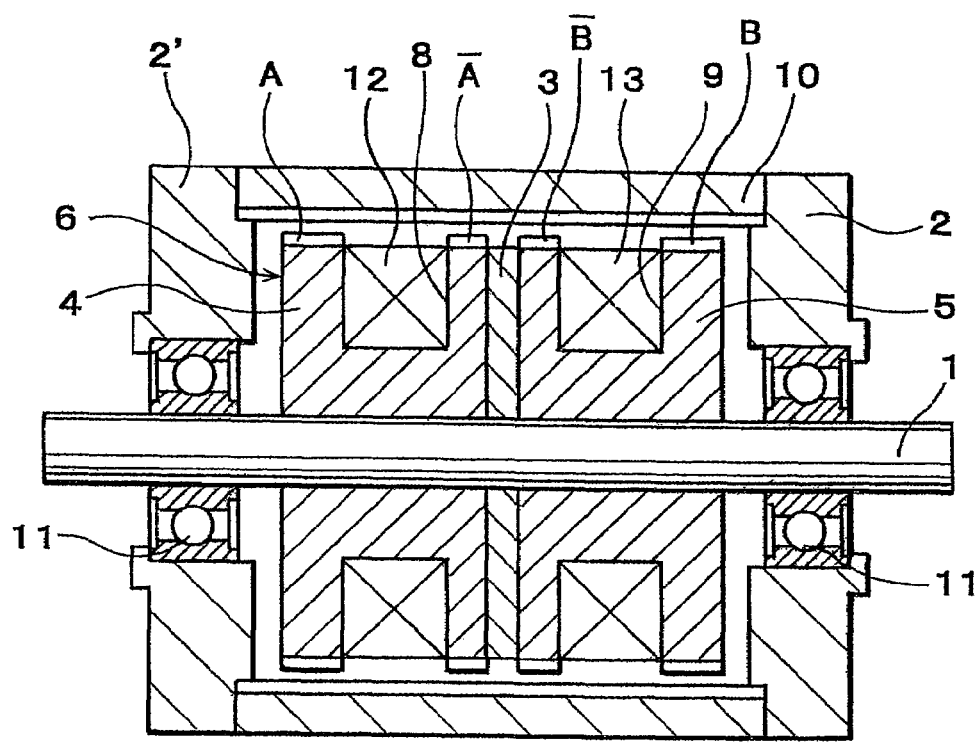
FIG. 1 is a vertically sectioned front view of an outer rotor type two-phase hybrid stepping motor according to the present invention.

As shown in FIG. 1, a multi-polar rotary machine, such as an outer rotor type two-phase hybrid stepping motor of an embodiment of the present invention comprises a stator 6 and a cylindrical outer rotor 10 arranged concentrically with the stator 6 and with an air gap therebetween.

Stator 6 has two splitted stator elements 4,5 and a ring shaped permanent magnet 3 held between the stator elements 4, 5 and magnetized so as to form N and S poles in the axial direction of the stator 6, a plurality of small stator teeth A and $\overline{A}$ separated in the axial direction of the stator 6 from each other and formed on the outer peripheral surface of one of the spaced stator elements 4, a plurality of small stator teeth $\overline{B}$ and B separated in the axial direction of the stator 6 from each other and formed on the outer peripheral surface of the other of the spaced stator elements 5, and stator windings 12, 13 for A phase and B phase wound around the stator elements 4, 5, respectively.

Rotor 10 has a plurality of small rotor teeth formed on the inner peripheral surface thereof similar in number to the small stator teeth. Small stator teeth A, $\overline{A}$, $\overline{B}$ and B are circumferentially shifted from the small rotor teeth by a ¼ pitch of the small stator teeth, respectively. Each of the stator 6 and the rotor 10 is formed of pressed powder consisting of soft magnetic material such as NIKKALOY EU-66X (trademark) made of HITACHI FUNMATSU YAKIN KABUSHIKI KAISHA and a binder. The binder consists of resin and/or inorganic material such as a glass.

In order to certify the effect of the motor according to the present invention, the magnetic field analysis using the three-dimensional finite element method is applied to a motor having a rotor of 35 mm in outer diameter, a stator of 28 mm in axial length, a magnet of 2 mm in thickness, and each of windings of 6 mm in thickness.

Figure 2:
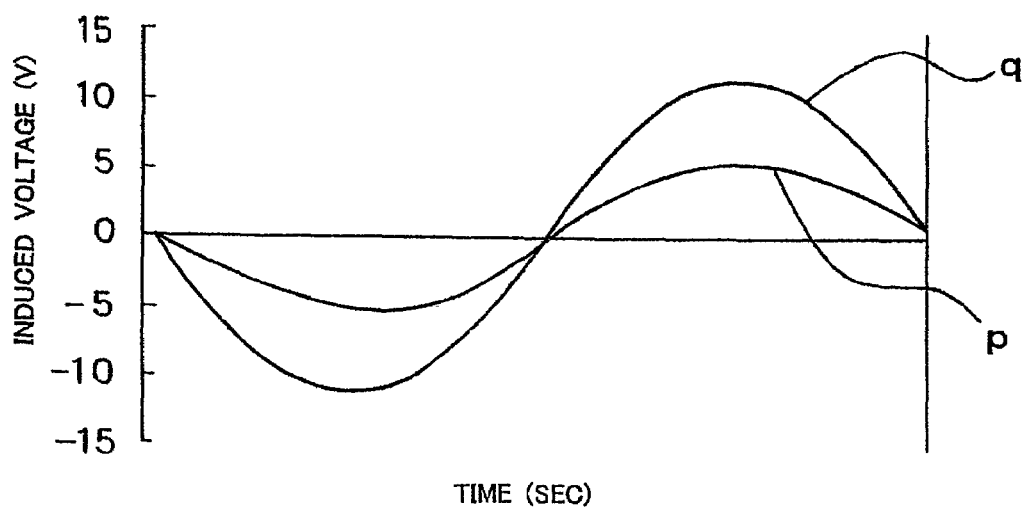
FIG. 2 shows waveforms of counter electromotive forces of the outer rotor type two-phase hybrid stepping motor shown in FIG. 1.

FIG. 2 shows waveforms of counter electromotive forces of the motor, A reference character q represents a waveform of counter electromotive force of the motor according to the present invention, of which stator and rotor are formed of pressed powder of the soft magnetic material, when the motor is rotated at 50 revolutions per minute. It is apparent that the counter electromotive force q is about 2.2 times larger than the counter electromotive force p of the conventional motor, of which stator and rotor are formed by laminated silicon steel plates.

Figure 3:
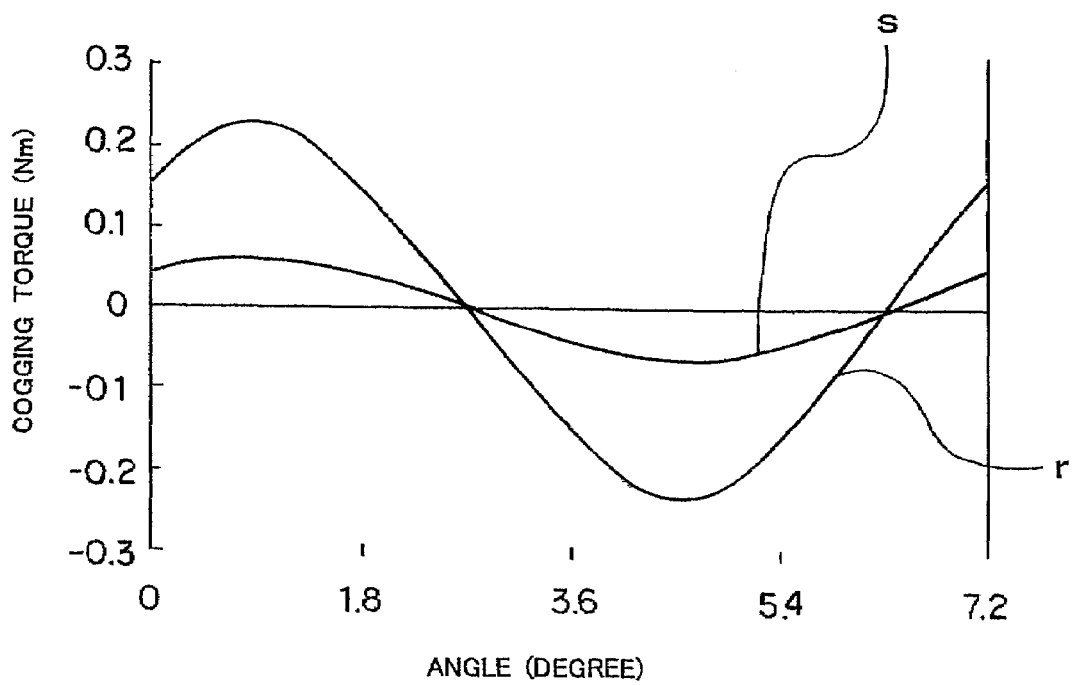
FIG. 3 shows waveforms of cogging torques of the motor shown in FIG. 1.

FIG. 3 shows a waveform of the cogging torque s of the motor according to the present invention.

It is apparent that the cogging torque s of the motor according to the present invention is reduced to about ⅕ of the cogging torque r of the conventional motor, of which stator and rotor are formed by laminated silicon steel plates.

The powder of soft magnetic material itself is high in electric resistance, so that the eddy current loss in the motor can be reduced, and accordingly it is effective to use for the higher speed motor.

In a second embodiment of the present invention, a ratio C of a thickness of the small stator teeth $\overline{A}$ in the axial direction of the stator to a thickness of the small stator teeth A in the axial direction of the stator (stack ratio) is set to a value smaller than 1, preferably 0.5 to 0.8 so as to equalize substantially in mean permeance both small stator teeth A and $\overline{A}$ to each other, and a ratio C of a thickness of the small stator teeth $\overline{B}$ in axial direction of the stator to a thickness of the small stator teeth B in the axial direction of the stator (stack ratio) is set to a value smaller than 1, preferably 0.5 to 0.8 so as to equalize substantially in mean permeance both small stator teeth $\overline{B}$ and B to each other.

Figure 4:
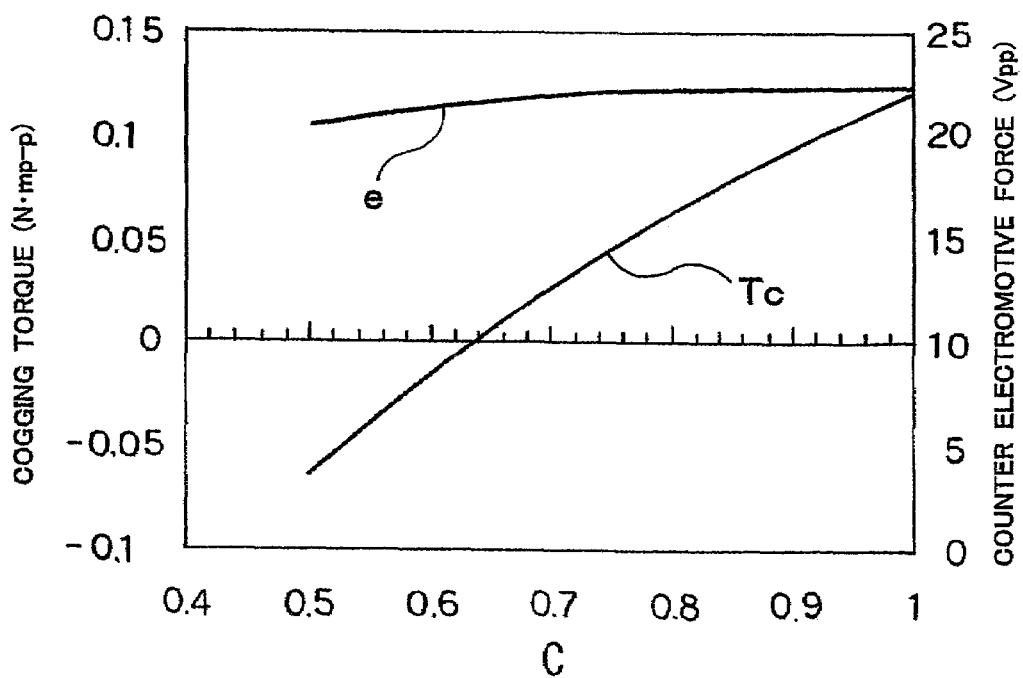
FIG. 4 is a diagram showing a characteristic feature of the cogging torque• counter electromotive force with respect to a stack ratio of the stator core.
Figure 5:
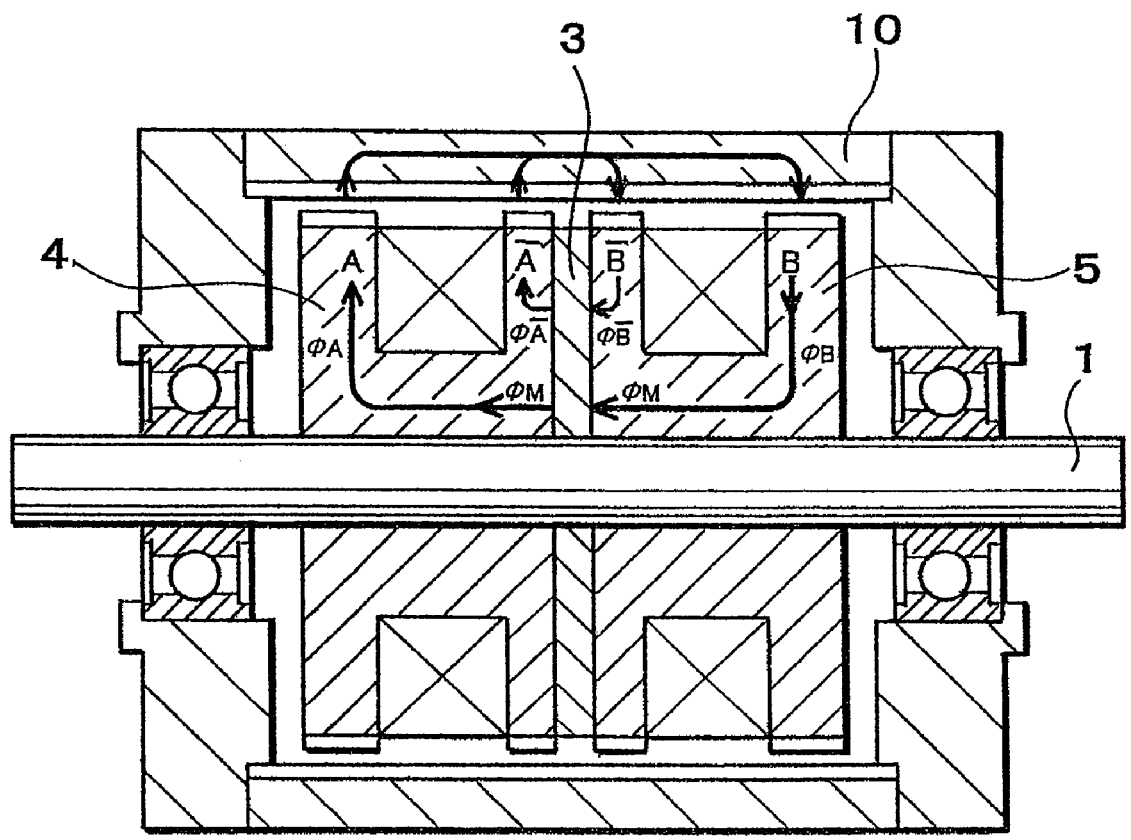
FIG. 5 shows paths of magnetic flux issued from a magnet of the motor shown in FIG. 1.
Figure 28:
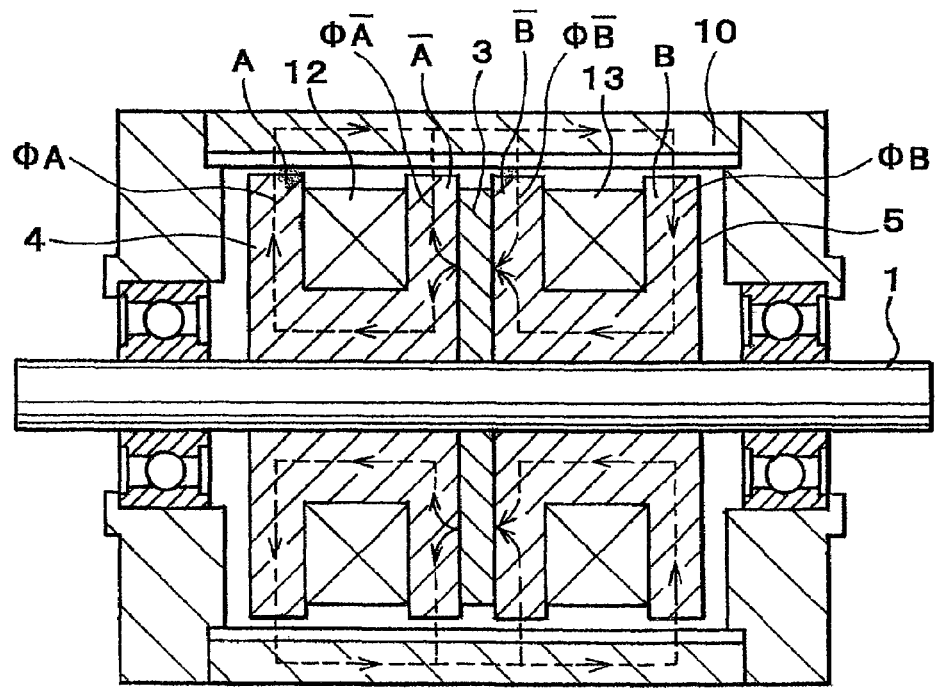
FIG. 28 shows paths of magnetic flux issued from a magnet in the motor shown in FIG. 26.
Figure 29:
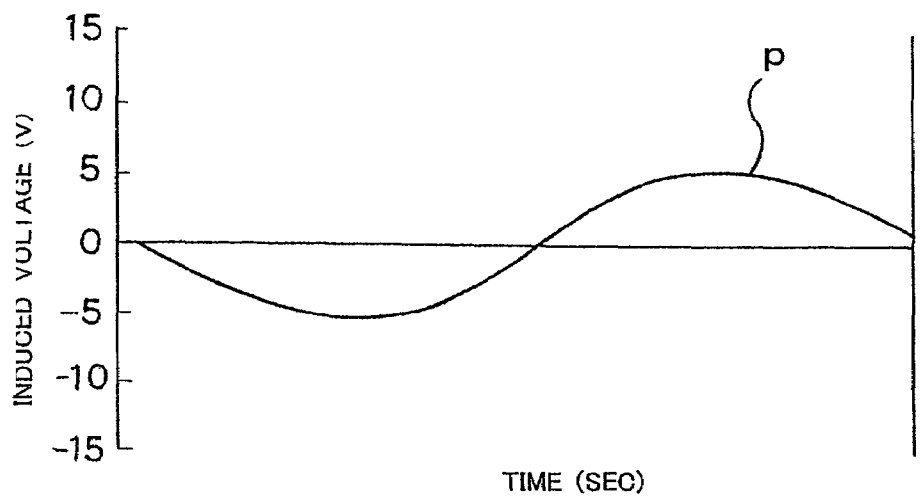
FIG. 29 shows a waveform of counter electromotive force of the motor shown in FIG. 26.
Figure 30:
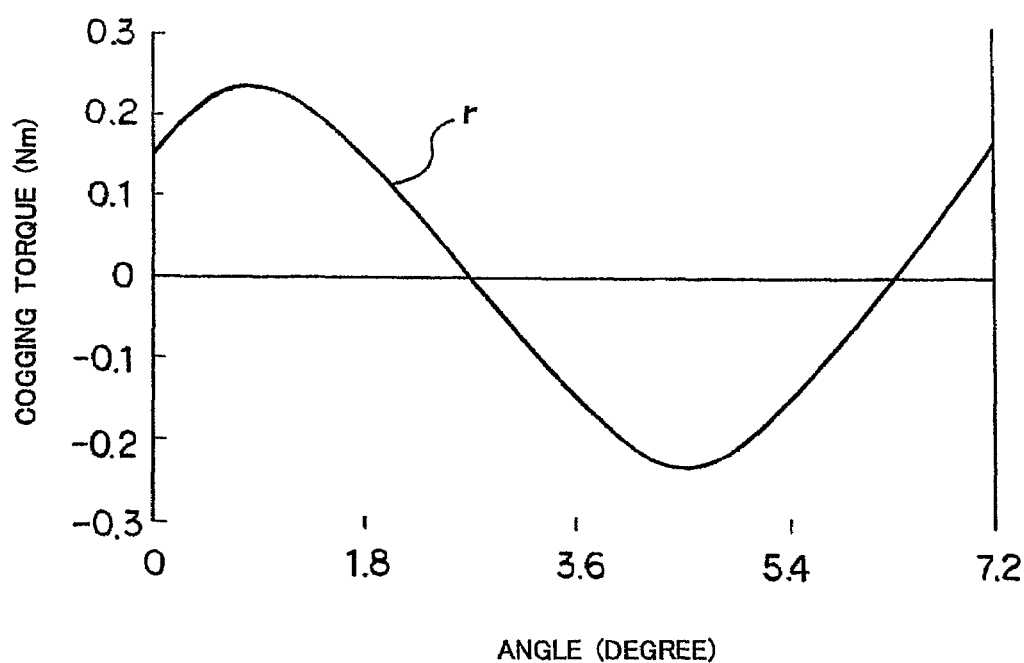
FIG. 30 shows a waveform of cogging torque of the motor shown in FIG. 26.

FIG. 4 is a diagram showing a characteristic feature of the cogging torque Tc and the counter electromotive force e with respect to the stack ratio C of the stator core. In FIG. 4, the abscissa shows the ratio C and the ordinate shows the counter electromotive force e and the cogging torque Tc. It is apparent from FIG. 4 that the change of the counter electromotive force e with respect to the change of the ratio C is small, and that the cogging torque Tc becomes minimum at the ratio C of about 0.64. In the conventional motor shown in FIG. 28, a magnetic path of the shortest loop is formed, because the small stator teeth $\overline{A}$ of the stator element 4 and the small stator teeth $\overline{B}$ of the stator element 5 are arranged in the vicinity of the magnet 3, so that the magnetic fluxes passing through the small stator teeth $\overline{A}$ and $\overline{B}$ are larger. In order to avoid such phenomenon, in the present invention, the thicknesses of the small stator teeth $\overline{A}$ and $\overline{B}$ in the axial direction of the stator are set smaller than the thicknesses of the small stator teeth A and B in the axial direction of the stator so as to balance the magnetic fluxes passing through the small stator teeth A and $\overline{A}$, and B and $\overline{B}$ as shown in FIG. 5. In this case, accordingly, the change of the counter electromotive force is small, and the cogging torque is small. Further, the optimum value of the ratio C in FIG. 4 depends on the permeance of the magnetic paths between the small stator teeth A and $\overline{A}$, and B and $\overline{B}$, and accordingly the optimum value of the ratio C will be changed according to the dimensions of the parts.

According to the present invention, the cogging torque Tc can be reduced without reducing the counter electromotive force e as shown in FIG. 4, so that a motor of high in power, small in size and low in vibration can be obtained.

In a third embodiment of the present invention, the small rotor teeth of the rotor 10 are arranged with vernier pitch different from the regular pitch of 7.2°, that is 360°/50 in case that the number of the small rotor teeth is 50, for example. The small rotor teeth of the vernier pitch are divided into two, for example, and a gap is formed between divided small rotor teeth so that the divided small rotor teeth are arranged axisymmetrically, in order to eliminate an unbalance magnetic attractive force in the radial direction of the rotor.

Figure 6:
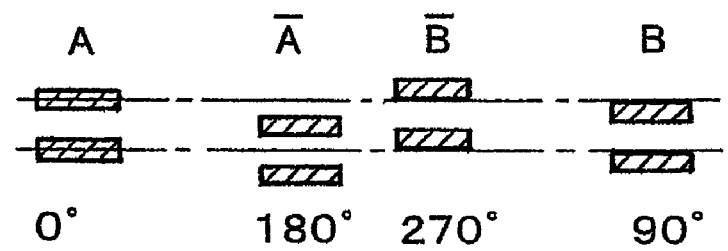
FIG. 6 shows phase relations in electrical angle of small stator teeth of the motor shown in FIG. 1.

In this case, the small stator teeth A, $\overline{A}$, B and $\overline{B}$ are circumferentially shifted from the small rotor teeth by 0°, 180°, 90° and 270° in electrical angle, respectively, as shown in FIG. 6.

Further, in the other embodiment of present invention, the same effect can be obtained by arranging the small stator teeth of the stator with vernier pitch, instead of the small rotor teeth of the rotor.

(Equivalent Magnetic Circuit of Motor)

Figure 7:
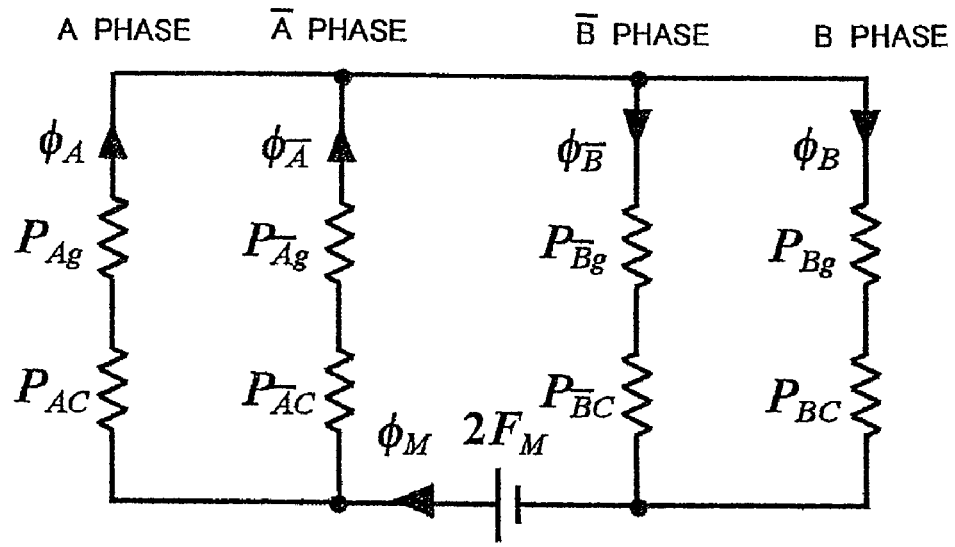
FIG. 7 shows an equivalent magnetic circuit of the motor according to the present invention.

In order to clarify the present invention, the equivalent magnetic circuit theory is applied to the motor. FIG. 7 shows an equivalent magnetic circuit of the stepping motor according to the present invention. A reference character $P_{ig}$ denotes an air gap permeance of i phases (here, i is A, B, $\overline{A}$ or B), $P_{iC}$ denotes a permeance of i phase magnetic path, $\phi_i$ denotes magnetic flux of i phase magnetic path, and $2F_M$ denotes a magnetomotive force. An internal permeance of the magnet is included into an internal permeance of the magnetic path of each phase for the shake of simplicity.

It is considered that the total permeance of the small stator teeth A and $\overline{A}$, and B and $\overline{B}$ with respect to the magnet is not so varied, because the small stator teeth A and $\overline{A}$, and B and $\overline{B}$ are arranged as shown in FIG. 6.

Figure 8:
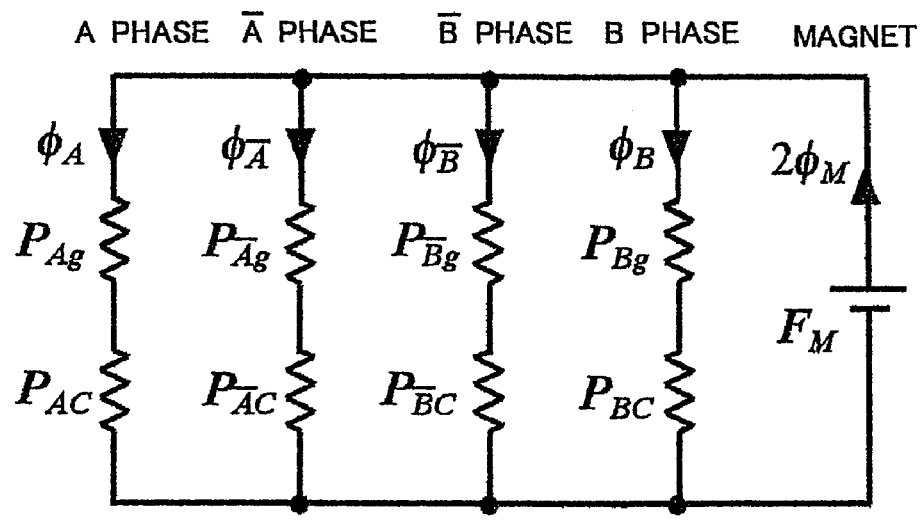
FIG. 8 shows a converted equivalent magnetic circuit of the motor according to the present invention.

Accordingly, if it is assumed that a half of the magnetomotive force of the magnet is applied equally on each of the small stator teeth of the A phase and B phase, the magnetic circuit can be converted into an equivalent magnetic circuit shown in FIG. 8.

Magnetic flux $\phi_i$ of i phase in FIG. 8 can be expressed by Formula 9.

$$\phi_i = \frac{F_M}{1/P_{ig} + 1/P_{iC}} = \frac{F_M P_{ig}}{1 + P_{ig}/P_{iC}} \quad (9)$$

In this case, $P_{iC}$ is a larger value with respect to the variable air gap permeance $P_{ig}$.

However, it is assumed that $1/(1+P_{ig}/P_{iC})$ is constant substantially with respect to the rotation for the shake of simplicity and expressed by Formula 10.

$$k_i = \frac{1}{1 + P_{ig}/P_{iC}} \quad (10)$$

Accordingly, Formula 9 can be expressed by Formula 11.

$$\phi_i = k_i F_M P_{ig} \quad (11)$$

$P_{ig}$ has a phase difference of 90° in electrical angle in each phase as shown in FIG. 6. Accordingly, if the small stator teeth are the same in shape and position in the peripheral direction, Formula 12 and Formula 13 can be obtained.

$$P_{ig1} = h_i \rho_{ig1} = h_i \left( \rho_0 + \sum_{n=1}^{\infty} \rho_n \cos n \varsigma_i \right) \quad (12)$$

$$\varsigma_i = \theta_e - (i-1)\frac{\pi}{2} \quad (13)$$

Here, a reference character $h_i$ denotes an effective length in the axial direction of the small stator teeth of each phase, $\rho_{ig1}$ denotes a permeance per unit axial length, $\rho_n$ denotes a coefficient of n th harmonic component, $\varsigma_i$ denotes an electrical angle of i th phase, and $\theta_e$ denotes an electrical angle of rotation.

(Effective Magnetic Flux and Electric Current Torque)

In the stepping motor of the present invention, torques $T_A$ and $T_B$ are generated by the mutual action of the magnetic fluxes $\phi_A$ and $\phi_B$ interlinkaging the winding of each phase and the electric currents $i_A$ and $i_B$ passing through the windings. If the numbers of the windings of A phase and B phase are the same and the number is $n_A$, Formula 14 can be obtained.

$$T_A = -i_A n_A \frac{d\phi_A}{dt}, \quad T_B = -i_B n_A \frac{d\phi_B}{dt} \quad (14)$$

Taking only the fundamental wave occupying a large component of the torque into consideration with the magnetic flux and the relation of Formulas 11 to 13, Formula 15 and Formula 16 can be obtained.

$$\phi_A = k_A F_M h_A (\rho_0 + \rho_1 \cos \theta_e), \quad (15)$$
$$\phi_B = k_A F_M h_A (\rho_0 + \rho_1 \cos(\theta_e - \pi/2))$$

$$\frac{d\phi_A}{dt} = -k_A F_M h_A \rho_1 \sin \theta_e, \quad \frac{d\phi_B}{dt} = -k_A F_M h_A \rho_1 \sin(\theta_e - \pi/2) \quad (16)$$

The torque can be expressed by Formula 17.

$$T_A = i_A n_A k_A F_M h_A \rho_1 n \sin \theta_e, \quad T_B = i_B n_A k_A F_M h_A \rho_1 n \sin(\theta_e - \pi/2) \quad (17)$$

Electric currents similar in phase to the counter electromotive force expressed by formula 18 are considered.

$$i_A = I_A \sin \theta_e, \quad i_B = I_A \sin(\theta_e - \pi/2) \quad (18)$$

A torque T expressed by Formula 19 is obtained.

$$T = T_A + T_B = \sqrt{2} I_A n_A k_A F_M h_A \rho_1 = \sqrt{2} I_A n_A \Delta \phi_A \quad (19)$$

Here, $\Delta \phi_A = k_A F_M h_A \rho_1$ is an amplitude of variable component of the magnetic flux in Formula 15.

It is understood that $\Delta \phi_A$ is essential to increase the torque at the magnetic circuit side, because the electric current torque (or torque constant) is in proportion to the amplitude $\Delta \phi_A$ of the variable component of the magnetic flux. It is understood further that the ampereturn $I_A n_A$ must be maintained at the winding side according to Formula 19.

In the stepping motor, other than the electric current torque which is an effective torque the cogging torque causing a vibration is generated, so that the cogging torque must be reduced.

(Cogging Torque)

The magnetic energy in the air gap occupying a large portion of the magnetic energy in the equivalent magnetic circuit shown in FIG. 8 is calculated by Formula 20.

$$W_g = \frac{1}{2}\sum_{i=1}^{4}\frac{\phi_i^2}{P_{ig}} = \frac{1}{2}\sum_{i=1}^{4}(k_i F_M)^2 P_{ig} \quad (20)$$

The cogging torque $T_c$ is given by the angle differentiation of magnetic energy, and expressed by Formula 21 in case of the two-phase motor.

$$T_C = \frac{N_R}{2}\sum_{i=1}^{4}(k_i F_M)^2 \frac{dP_{ig}}{d\theta_e} = \frac{N}{2}F_M^2 \sum_{i=1}^{4}k_i^2 h_i \frac{d\rho_{ig}}{d\theta_e} \quad (21)$$

Here, a reference character N denotes a number of small rotor tooth, and $\theta_e$ denotes an electrical angle. It is assumed that $k_i$ is not varied by the rotary angle. Formula 22 can be obtained.

$$T_C = \frac{N}{2}F_M^2 \frac{d}{d\theta_e}\sum_{i=1}^{4}(k_i^2 h_i)\rho_n \cos n\varsigma_i \quad (22)$$

(Relation Between the Harmonic Component and the Cogging Torque)

Table 1 shows harmonic components of air gap permeance in each phase. A coefficient $(k_i^2 h_i)\rho_n$ of each phase is omitted for the sake of simplicity.

TABLE 1

| | Harmonic Order | | | |
|---|---|---|---|---|
| | 1 | 2 | 3 | 4 |
| $\rho_A$ | $\cos(\theta_e)$ | $\cos(2\theta_e)$ | $\cos(3\theta_e)$ | $\cos(4\theta_e)$ |
| $\rho_B$ | $\sin(\theta_e)$ | $-\cos(2\theta_e)$ | $-\sin(3\theta_e)$ | $\cos(4\theta_e)$ |
| $\rho_{\overline{A}}$ | $-\cos(\theta_e)$ | $\cos(2\theta_e)$ | $-\cos(3\theta_e)$ | $\cos(4\theta_e)$ |
| $\rho_{\overline{B}}$ | $-\sin(\theta_e)$ | $-\cos(2\theta_e)$ | $\sin(3\theta_e)$ | $\cos(4\theta_e)$ |
| $\Sigma\rho_i$ | $\approx 0$ | $= 0$ | $\approx 0$ | $4\cos(4\theta_e)$ |

Here, $\rho_n$ is equal in each phase.

$(k_i^2 h_i)\rho_n$ is equal between A and B, and $\overline{A}$ and $\overline{B}$ phases, because of the same construction, but $(k_i^2 h_i)\rho_n$ is different between A and $\overline{A}$, and B and $\overline{B}$ phases, because of the different construction. Accordingly, as shown in Table 1, the sum of secondary harmonic components becomes zero. However, $(k_i^2 h_i)\rho_n$ in each phases is necessary to accord with one another in order to make zero the sum of primary or secondary harmonic components. In the Table 1, the sum of the harmonic components is obtained on the assumption that $(k_i^2 h_i)\rho_n$ is similar substantially with respect to each phase. In the potion of the sum total $\Sigma$ of Formula 22, primary to tertiary harmonic components are cancelled to one another, so that remaining quaternary harmonic components occupy a large portion of the cogging torque. Accordingly, the quaternary harmonic components of the air gap permeance $P_{ig}$ in each phase must be reduced to zero with respect to each winding pole. This means that $\rho_n$ in Formula 22 is set to zero.

(Improvement by Small Teeth Arrangement)

A method of eliminating specific harmonic components, that is, the quaternary harmonic components by the arrangement of the small teeth utilizing the fact that the air gap permeace $P_{ig}$ consists of the total of each small tooth permeance will be examined.

(Total of Small Teeth Permeances)

The air gap permeance $P_{ig}$ in each phase can be considered as the total of the permeances $P_{ik}$ (here, i is a phase number, and k is small tooth number) between small teeth, as shown in Formula 23.

$$P_{ig} = \sum_{k=1}^{N} P_{ik} \quad (23)$$

In this examination, therefore, the permeance is culculated in accordance with each small tooth, and the premeance of the winding pole is obtained by a sum of the calculated premeances.

Figure 9:
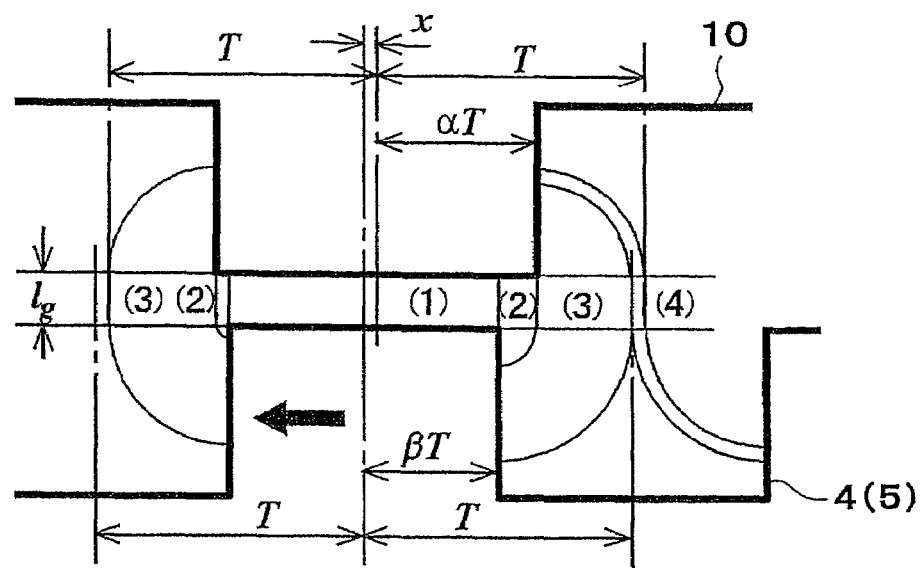
FIG. 9 is an explanation view of imaginary magnetic paths formed between small teeth of a stator and a rotor of the motor according to the present invention.

The assumed magnetic path method is adpted for calculation of the permeance, and an example of the magnetic path of one small tooth portion is shown in FIG. 9. In FIG. 9, reference character 2T denotes a magnetic pole pair pitch (pitch of small stator tooth), α and β denote ratios of the small tooth width of the stator and of the rotor to the magnetic pole pitch, x denotes a rotational displacement between the center of the small stator tooth and the center of the small rotor tooth, and (1), (2), . . . denote divisions in accordance with a type of the magnetic path. The permeance of each magnetic path portion of the division (1), (2), (3) or (4) is culculated by Formula 24 and totalized them.

$$P = \mu_0 \int \frac{dS}{l} \quad (24)$$

Figure 10:
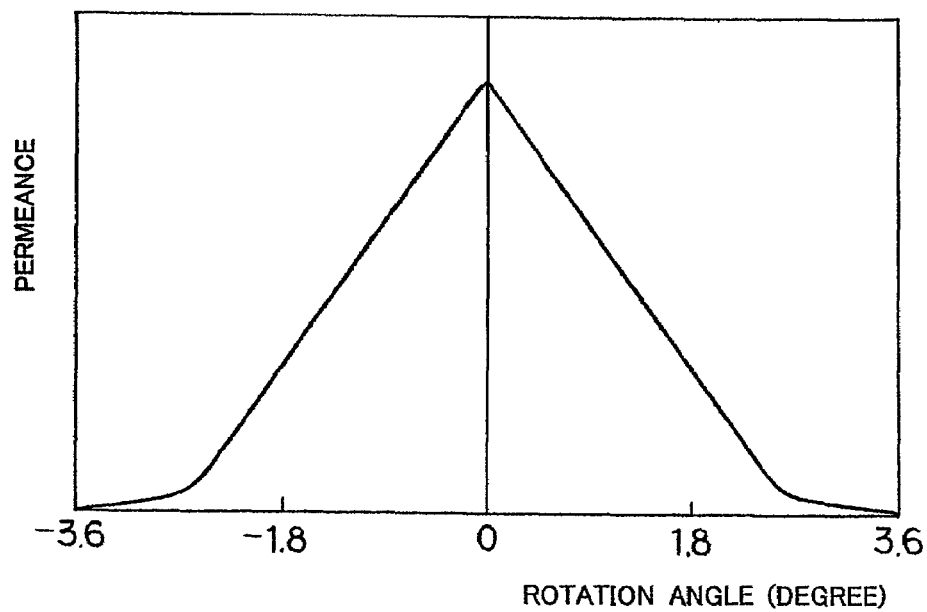
FIG. 10 is an explanation view of the change of general form permeance of one small tooth of the motor according to the present invention.

Here, $\mu_o$ denotes the space permeability, dS denotes a differential opposed area, and l denotes a magnetic path length. The permeance is varied bisymmetrically according to the even function as shown in FIG. 10, in case that the rotor tooth width is equal to the stator tooth width, that is, α=β.

Figure 11:
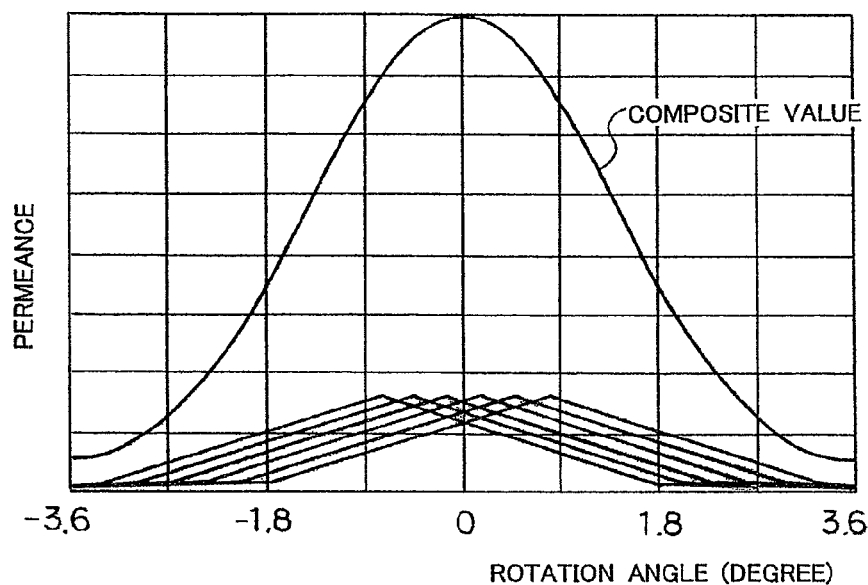
FIG. 11 is an explanation view of a composite phase permeance of the small teeth of the motor according to the present invention.

The total permeance of all phases can be obtained by totalizing presences of N pieces of small tooth. In case of the motor shown in FIG. 1 the number of small teeth is 50, so that permeances of 50 pieces of small tooth are totalized. However, FIG. 11 shows a composite value of permeances obtained by totalizing permeances of six small teeth for the sake of simplicity. In this case, waveforms of permeances of the small teeth are shifted slightly with one another because the pitch of the small teeth is a vernier pitch, different from the normal pitch, so that the composite value of the permeances thereof becomes a waveform varying smoothly. The air gap permeance $P_{ig}$ in each phase is an even function with respect to the angular displacement, and Formula 12 can be obtained by Fourier expansion.

(Principle of Improvement by Small Teeth Arrangement)

It is expected that the waveform of the permeance becomes smooth by the arrangement of the small teeth shifted slightly from the pole pitch, respectively, and the cogging torque is reduced. Here, the principle is considered. In order to remove specific n th harmonic components by the combinationation of the small teeth permeances Formula 25 must be satisfied. In case that the cogging torque of the two-phase motor is reduced, n is 4.

$$\rho_n = m \sum_{k=1}^{Q} \rho_{1kn} = 0 \quad (25)$$

Here, m is a number of groups of small teeth, and Q is a number of small tooth in one group and N=mQ. $\rho_{lkn}$ is a n th harmonic component of unit length permeance of k th small tooth, and can be specified in the form of complex vectors used a deviation from the reference angle (small tooth permeance vectors), as shown in Formula 26.

$$\rho_{1\,kn} = \rho_{1\,kn} e^{j\,n\,p\,\theta_k} \quad (26)$$

Here, $\rho_{1kn}$ is an amplitude of n th harmonic component of small tooth permeance, p is a number of magnetic pole pairs and equal to the number N of the small tooth in the motor of the present invention shown in FIG. 1, and $\theta_k$ is a position (machine angle) of a k th small tooth.

The position $\theta_k$ can be expressed by using a deviation angle $\delta\theta_k$ from an angle (reference angle) $\theta_{k0}$ in case that the small teeth are arranged by magnetic pole pair pitch, as shown in Formula 27.

$$\theta_k = \theta_{k0} + \delta\theta_k = 2\pi(k-1) + \delta\theta_k \quad (27)$$

Because $e^{jnp\theta k0} = e^{j2\pi np(k-1)} = 1$, Formula 26 becomes in the same form in case that the deviation angle $\delta\theta_k$ is used instead of the position $\theta_k$. The condition for reducing the cogging torque can be expresed by Formula 28 using Formula 25 similarly.

$$\sum_{k=1}^{Q} \rho_{1kn} = \sum_{k=1}^{Q} \rho_{1kn} e^{jnp\delta\theta_k} = 0 \quad (28)$$

The deviation angle $\delta\theta_k$ can be expressed by an angle from zero position, because the reference angle $\theta_{k0}$ is always zero angle. In such condition, if permmeance vectors of small teeth are shown on a harmonic vector plane expressed by electrical angle, a vector sum of the permeance vectors becomes zero. Each vector is rotated while maintaining the relative positions, so that the balance is maintained always during the rotation and the cogging torque is minimized.

(Removal of Quaternary Harmonic Component)

A method of reducing the cogging torque is considered utilizing the above conception. It is necessary to arrange the small teeth axisymmetrically in order to avoid the unbalance in the radial direction. In case that the number of the small tooth is 50, the small teeth are divided into two groups and arrange axisymmetrically.

In case that only the quaternary harmonic component which has a large relation to the cogging torque is removed, the vernier system wherein the pitch of the small tooth is varied is preferable.

In case that the small teeth in one group are arranged at regular pitch, the deviation angle $\delta\theta_k$ is equal with respect to each small tooth, so that it is necessary to arrange Q pieces of vector $\rho_{1kn}e^{jnp\delta\theta_k}$ in a circle on the vector plane in order to realize Formula 25.

In this case, the deviation angle $\delta\theta_k$ is expressed by Formula 29.

$$\delta\theta_k = \frac{2\pi}{npQ} \quad (29)$$

In the motor of the present invention shown in FIG. 1, p is 50 and Q is 25, so that n is 4 and the deviation angle $\delta\theta_k$ is 0.072°. The small tooth pitch $\theta_{k0}$ is 7.2° and shifted to the negative side by $\delta\theta_k$, so that $\theta_{k0}$ becomes 7.128°.

It is apparent that the displacements of negative side and positive side have the same effect with each other, as described with respect to Formula 25 to Formula 29.

(Elimination of Two Kinds Harmonic Waves)

As stated above, it is not necessary to arrange the small teeth in the regular pitch and it is possible to arrange arbitrary in order to satisfy Formula 25. However, the axisymmetric construction is preferable as stated above. It is required to obtain positive effects, such as the removal of the two kinds of harmonic waves in the irregular pitch arrangement.

Further, it is considered to remove not only the quaternary harmonic wave having a large relation to the generation of the cogging torque, but also the tertiary harmonic wave. In this case, the 50 pieces of small tooth are divided into two groups so as to satisfy the axisymmetericality, and one group is divided further into five subgroups in consideration of the factors. The tertiary harmonic component is removed from each subgroup and the quaternary harmonic wave is removed among five subgroups. In this case, Q is 5, so that the deviation angle $\delta\theta$ can be expressed by Formula 29 as following.

In each subgroup, $\delta\theta$ is 0.48° (elimination of the tertiary harmonic wave).

Among five subgroups, $\delta\theta$ is 0.36° (elimination of the quaternary harmonic wave).

Figure 12A:
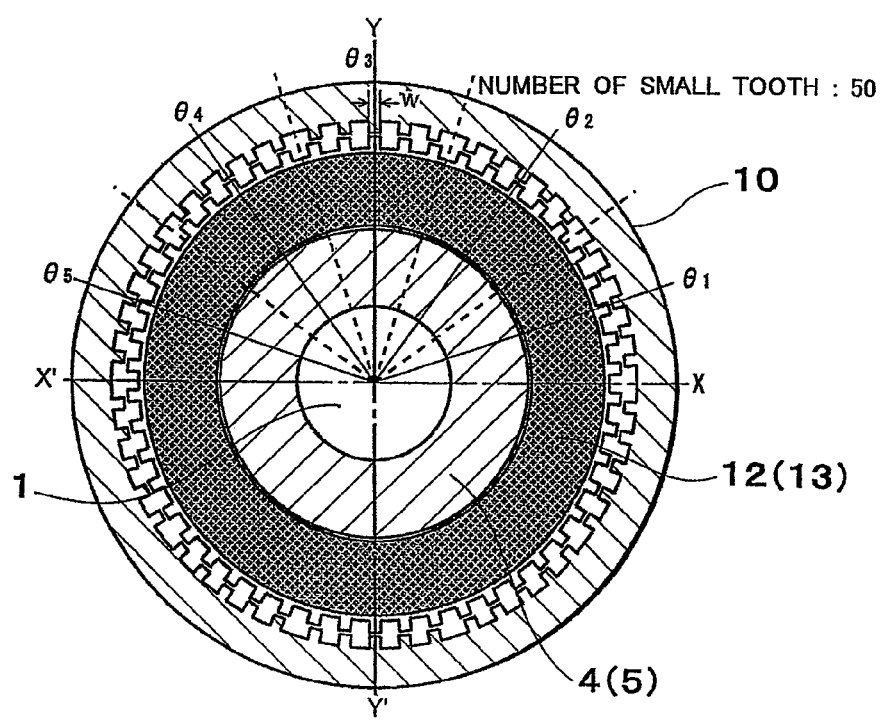
FIG. 12A is a vertically sectioned side view of a motor according to the present invention having a small teeth arrangement for eliminating the tertiary and quaternary harmonic waves.

FIG. 12A shows a rotor having the small teeth arranged as above.

Figure 25:
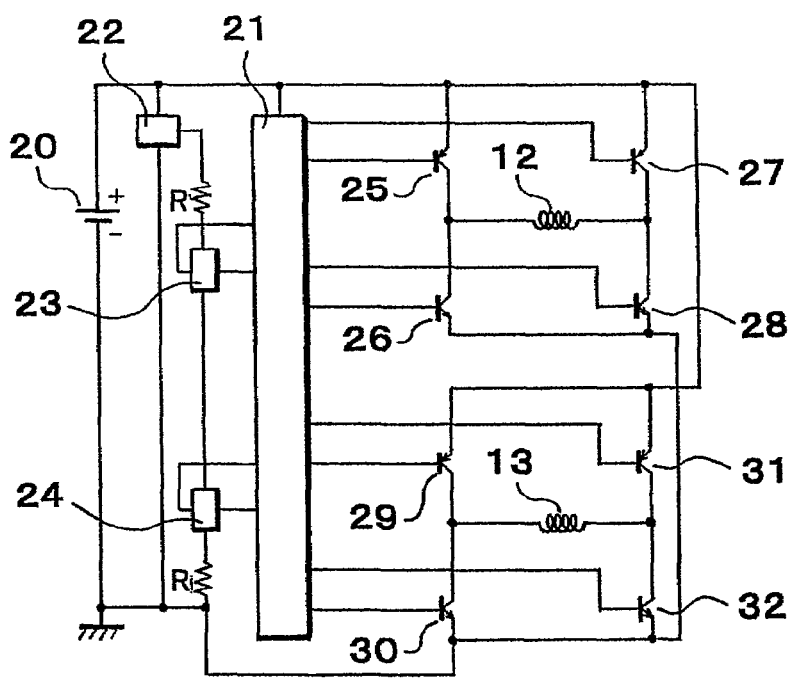
FIG. 25 shows an electric circuit of a motor according to the other embodiment of the present invention.

In FIG. 12A, 25 pieces of small tooth on the upper half portion of the rotor divided by a line X-X' are divided into five subgroups.

In each subgroup, a distance between small teeth is (7.2°−0.48°=6.72°). An angle among the groups, that is among lines $\theta_1$, $\theta_2$, $\theta_3$, $\theta_4$, and $\theta_5$ is (7.2°×5−0.36°=35.64°).

In the above case, the change of the small teeth arrangement is carried out about the rotor side, however, the change can be carried out about the stator side instead of the rotor side.

Figure 13:
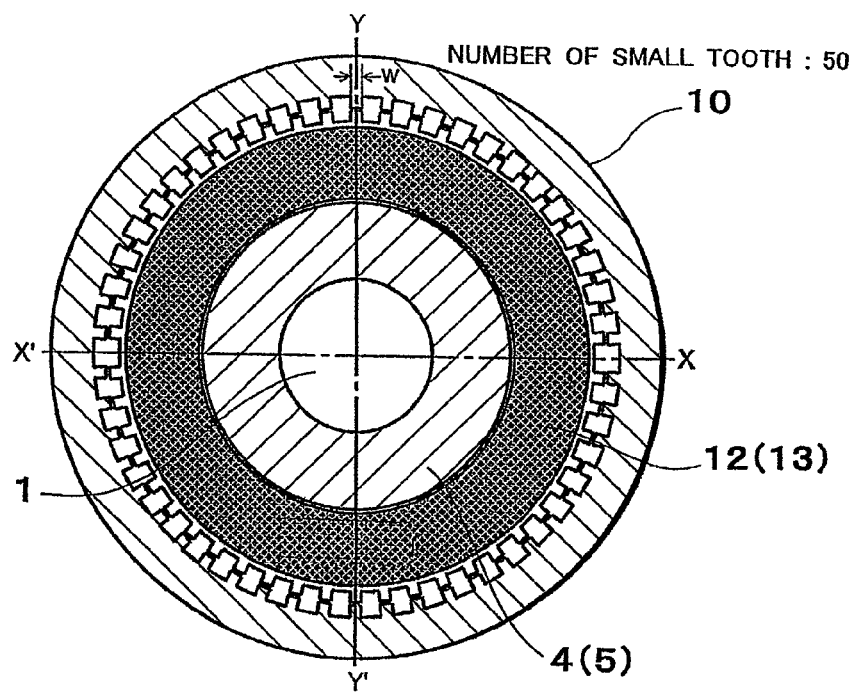
FIG. 13 is a vertically sectioned side view of a motor according to the present invention having the other small teeth arrangement for eliminating the tertiary and quaternary harmonic waves.

In case that two kinds of harmonic waves, such as quaternary and tertiary harmonic waves are removed, a small rotor tooth pitch (distance) is set to (7.2°−360/(4×50× 25)=7.128°), and a small stator tooth pitch is set to (7.2°− 360/(3×50×25)=7.104°) as shown in FIG. 13, for example.

(Improvement of Balance of Odd Number Harmonic Components)

In Table 1, the permeance variations are totalized on the assumption that the coefficient $(ki^2hi)\rho_n$ is equal with respect to each phase. In case of the odd number harmonic waves (fundamental wave and the tertiary wave), $\Sigma\rho$ can not be set to zero unless $(ki^2hi)$ is equal with respect to A phase and $\overline{A}$ phase.

$k_A$ and $k_{\overline{A}}$ are expressed by Formula 30 according to Formula 10.

The same Formula can be obtained with respect to B phase.

$$k_A = \frac{1}{1+P_{Ag}/P_{AC}}, k_{\overline{A}} = \frac{1}{1+P_{\overline{A}g}/P_{\overline{A}C}} \quad (30)$$

The magnetic path of the A phase is longer by a length of iron core between the A and $\overline{A}$ phases than that of the $\overline{A}$ phase. Accordingly, $P_{AC} < P_{\overline{A}C}$ and $k_A < k_{\overline{A}}$. Thus, such a relation of $h_A < h\overline{A}$ is required in order to set equal $(k_A^2 h_A)$ to $(k_{\overline{A}}^2 h_{\overline{A}})$.

That is, the small teeth length of A phase in the axial direction must be longer than that of $\overline{A}$ phase.

The magnetic flux $\phi_A$ of A phase and the amplitude $\Delta\phi_A$ of the variable component thereof are reduced by the magnetic reluctance of the magnetic path, and the electric current torque is reduced. The electric machine using laminated steel plates has small air gaps between the laminated steel pates, so that the magnetic reluctance is increased. Accordingly, it is preferable to use thicker steel plate and to reduce the number of the laminated steel plate. Further, it is preferable to use an iron core made of insulating powder, because the relative difference between $k_A$ and $k_{\overline{A}}$ becomes small.

(Study by Three-Dimensional FEM Magnetic Field Analysis)

The amplitude $\phi_{CM}$ of the magnetic flux variation which affects on the torque generation and the cogging torque which effects on the vibration are calculated under many conditions by using a magnetic field analyzing program of the three-dimensional finite element method which is actually used for the hybrid type stepping motor.

(Iron Core Material and Stack Ratio)

Figure 14:
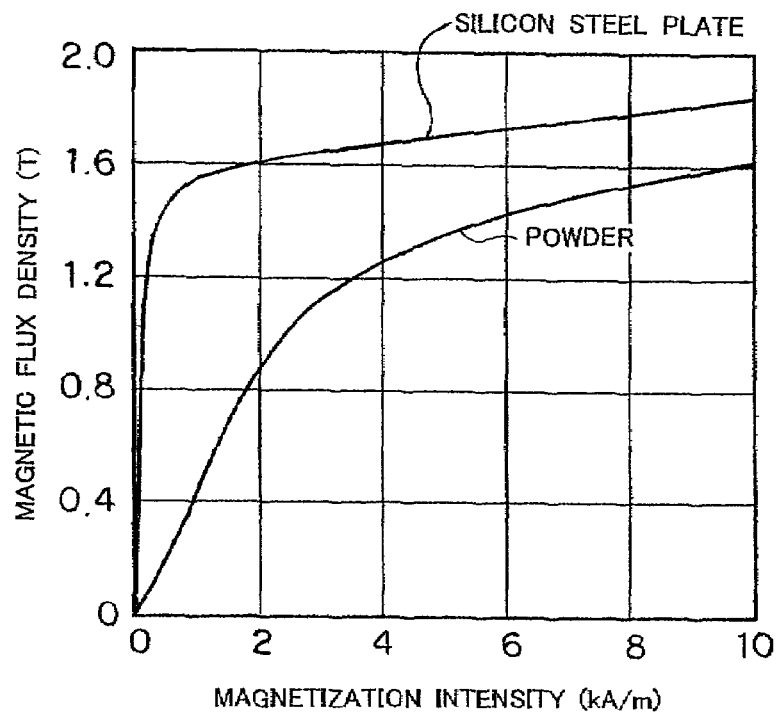
FIG. 14 is a diagram showing a characteristic feature of B-H curves of core materials.

Effects of ki when the length hi of the small stator teeth in the axial direction is varied are studied about the laminated silicon steel plates and the pressed powder magnetic core in order to correct the effects of ki which are different in the positive phases A and B and the negative phases $\overline{A}$ and $\overline{B}$. B-H curves of both materials are shown in FIG. 14. A samarium cobalt magnet (SmCo) having Br of 0.75 tesla is used. The calculation is carried out by setting the space factor of steel plates to 97% in case that the thickness of the plate is 0.35 mm, and to 98% in case that the thickness of the plate is 0.5 mm, and varying B-H characteristic feature in the axial direction in consideration of the small air gaps due to the lamination.

The motor to be tested has a rotor of 35.4 mm in outer diameter, 29.6 mm in inner diameter and 7.128° in small rotor tooth pitch, a stator of 7.2° in small stator tooth pitch, a magnet of 27.6 mm in outer diameter, 20 mm in inner diameter and 2 mm in thickness, and a winding of 6 mm in axial length. An air gap between the inner peripheral surface of the rotor and the outer peripheral surface of the stator is 0.1 mm. The tooth width and groove depth of each of the rotor and the stator are 0.7 mm, respectively. The calculation is carried out by varying the stack ratio so that the sum of the lengths in the axial direction of the small stator teeth of the positive and negative phases is set to 6 mm.

Figure 15:
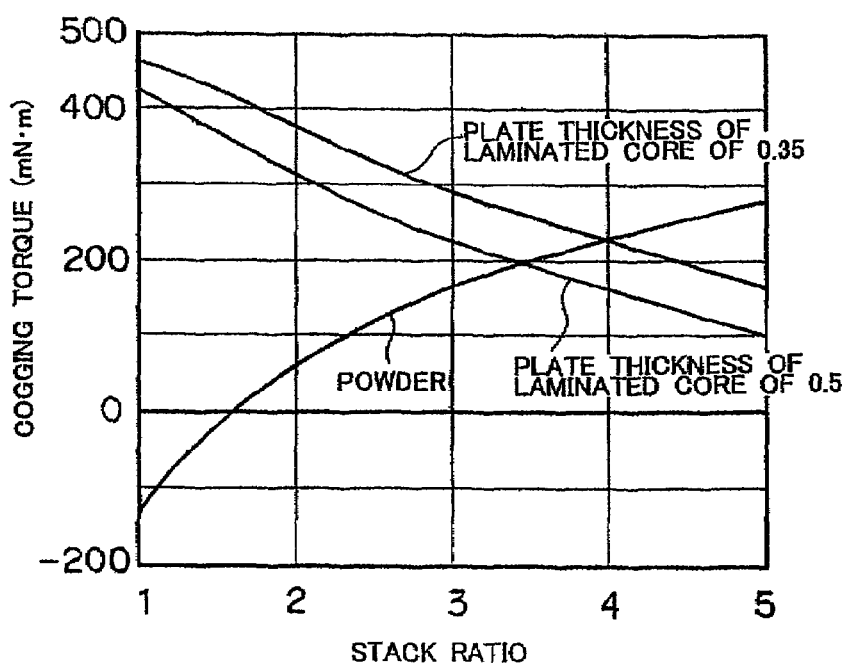
FIG. 15 is a diagram showing a characteristic feature of cogging torque and stack ratio of iron core.
Figure 16:
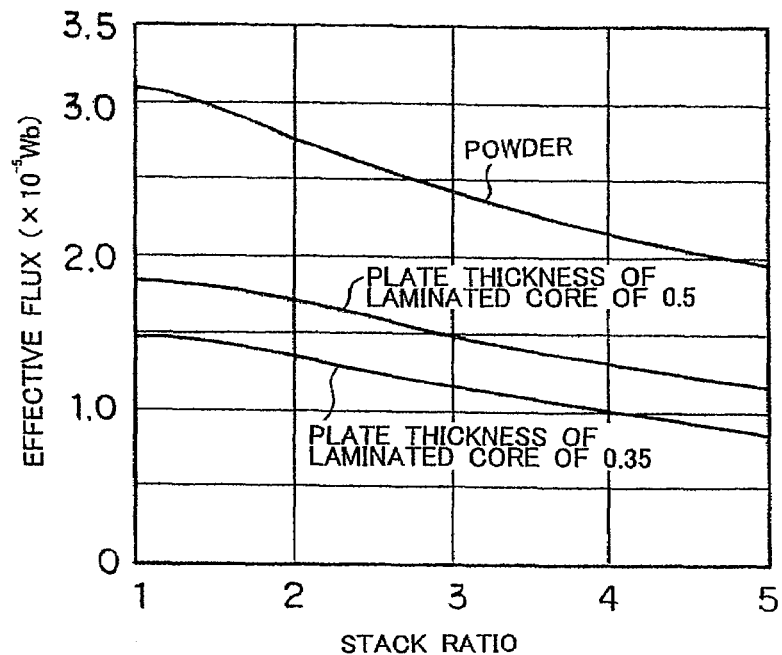
FIG. 16 is a diagram showing a characteristic feature of effective flux and stack ratio of iron core.

The results of calculation of the cogging torque and the effective magnetic flux in case that the stack ratio (1/C) of the positive and negative phases is varied are shown in FIG. 15 and FIG. 16. The cogging torque shown in FIG. 15 is a peak to peak value of the cogging torque generated by the magnetic flux according to the rotation of the motor. The effective magnetic flux $\phi_{CM}$ shown in FIG. 16 is obtained as a value of one half of the variation (magnitude) of the magnetic flux $\phi_A$.

As apparent from FIG. 15, the cogging torque is larger in case that the plate thickness is smaller in the laminated iron core. In case of pressed powder magnetic core, the cogging torque has a zero cross-point at a stack ratio of about 1.6, but in case of magnetic core formed by the laminated steel plates, the cogging torque has not zero cross-point in the range of from 1 to 5 of the stack ratio.

As apparent from FIG. 16, the effective magnetic flux in the pressed powder magnetic core which is wrong in B-H characteristic feature is larger remarkably than that of the magnetic core formed of the laminated steel pates. This is because that in the iron core formed of the laminated steel plates, the permeance in the axial direction is lowered and the magnetic flux can not pass easily through the winding.

Figure 17:
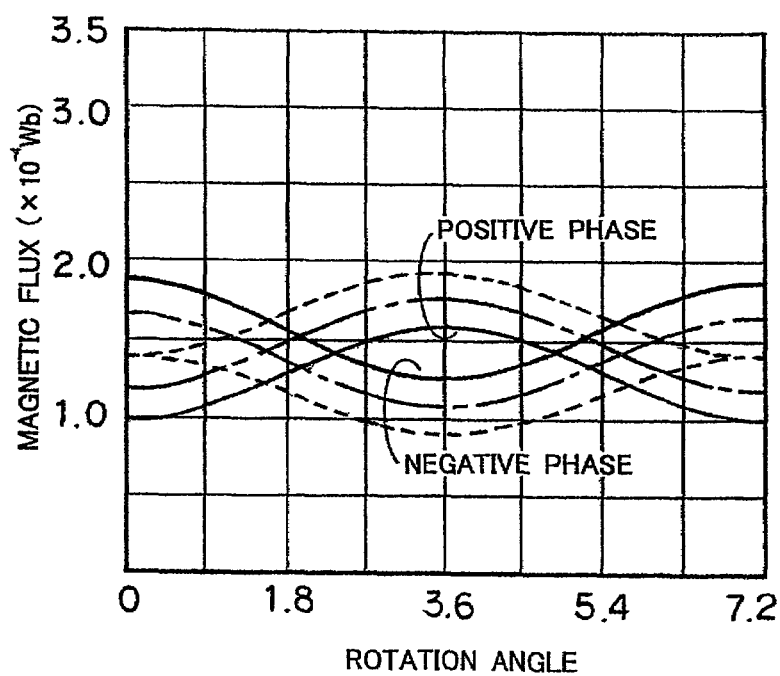
FIG. 17 is a diagram showing variations of magnetic flux with rotation.

As stated above, it is understood that the pressed powder iron core is the best for the effective magnetic flux. In FIG. 17, a dot line, a single dot-and-dash-line and a solid line show magnetic fluxes of the pressed powder iron cores with respect to the rotation angle thereof, of which stack ratios are 1.0, 1.4 and 2.0, respectively. FIG. 17 shows the fact that the magnetic flux is constant substantially, that the assumption for analyzing the equivalent circuit show in FIG. 8 is valid, and that the mean level of the magnetic fluxes is elevated, if the length of the small teeth of the positive phase is increased, but the variation amplitude, namely, the effective magnetic flux is reduced. The balance of the positive/negative phases is the best at 1.4 of the stack ratio.

The variable magnetic flux in both phases contributing the torque generation is small and 40% or more. However, it is considered that the interlinkaging magnetic flux is larger than that in the normal structure, because the magnet is large and the number of winding in each phase is 1.

(Effect of Vernier Pitch)

Figure 18:
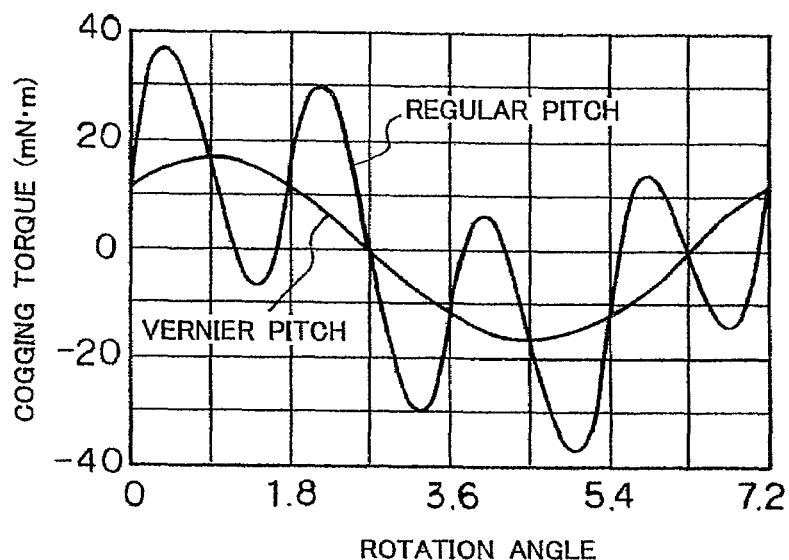
FIG. 18 is a diagram showing an effect of vernier pitch with respect to cogging torque.

FIG. 18 shows the variation of the cogging torques of regular pitch and vernier pitch, in case that the stack ratio is 1.4. The large cogging torque of quaternary frequency generated in case of the regular pitch is eliminated, if the vernier pitch shown in Formula 29 is used, but the variable cogging torque of fundamental frequency remains. It is considered that the variable cogging torque of fundamentally frequency maybe reduced if the stack ratio is increased from 1.4 to 1.6.

(Affection of Tooth Width)

Figure 19:
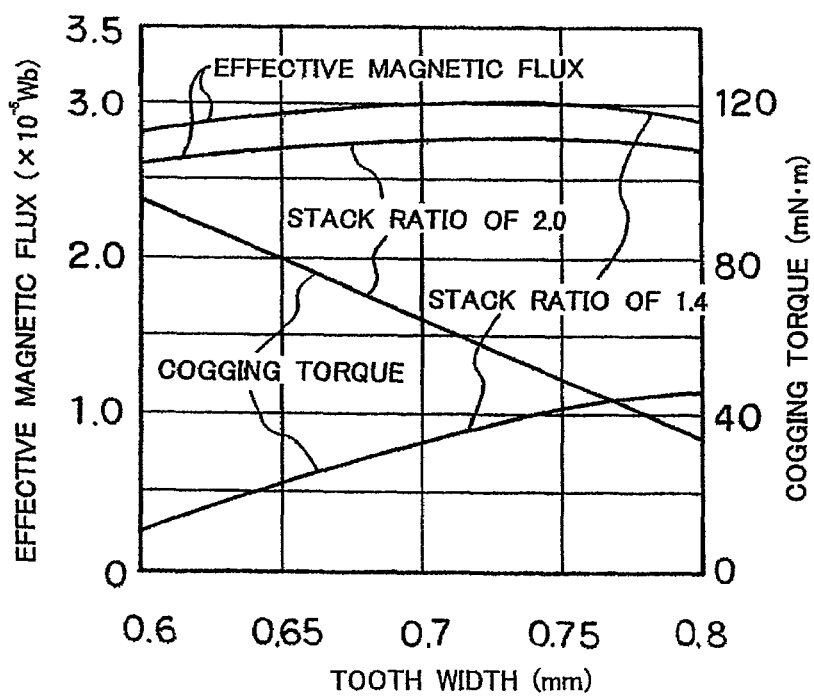
FIG. 19 is a diagram showing an effect of tooth width with respect to effective magnetic flux and cogging torque.

FIG. 19 shows the changes in effective magnetic flux and cogging torque when the tooth width is varied from 0.6 mm to 0.8 mm with respect to the stack ratios of 1.4 and 2.0. The effective magnetic flux is not so varied, and becomes maximum at the tooth width of in the range of 0.7 to 0.75 with respect to each stack ratio. The cogging torque is increased according to the tooth width with respect to the stack ratio of 1.4, but decreased with respect to the stack ratio of 2.0, because the balances in the positive and negative phases are varied. Accordingly, it is considered that the tooth width of 0.7 mm (magnetic pole pair pitch of 38%) is optimum value.

(Embodiment of Teeth Divided into Four Groups)

Figure 12B:
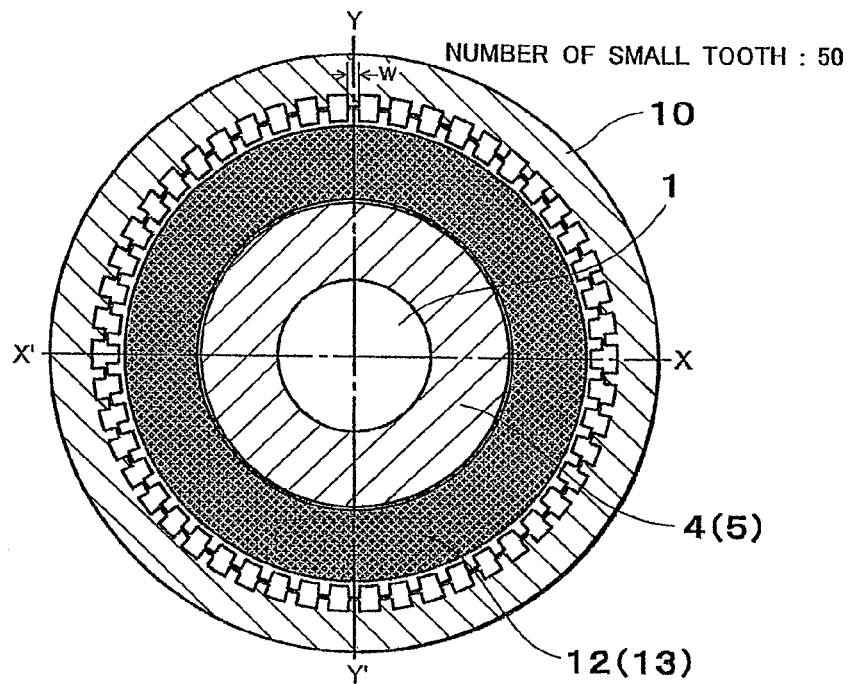
FIG. 12B is a vertically sectioned side view of a motor according to the present invention having a small teeth arrangement divided into two groups.

In case that the number of small tooth is 50, it is considered that the small teeth are divided into two groups each having 25 pieces of small tooth, as shown in FIG. 12B or divided into five groups each having 10 pieces of small tooth as shown in FIG. 12A, while maintaining the axisymmetricality.

In case that the number of small tooth is 48, it is possible to divide the small teeth into four groups as shown in FIG.

Figure 20:
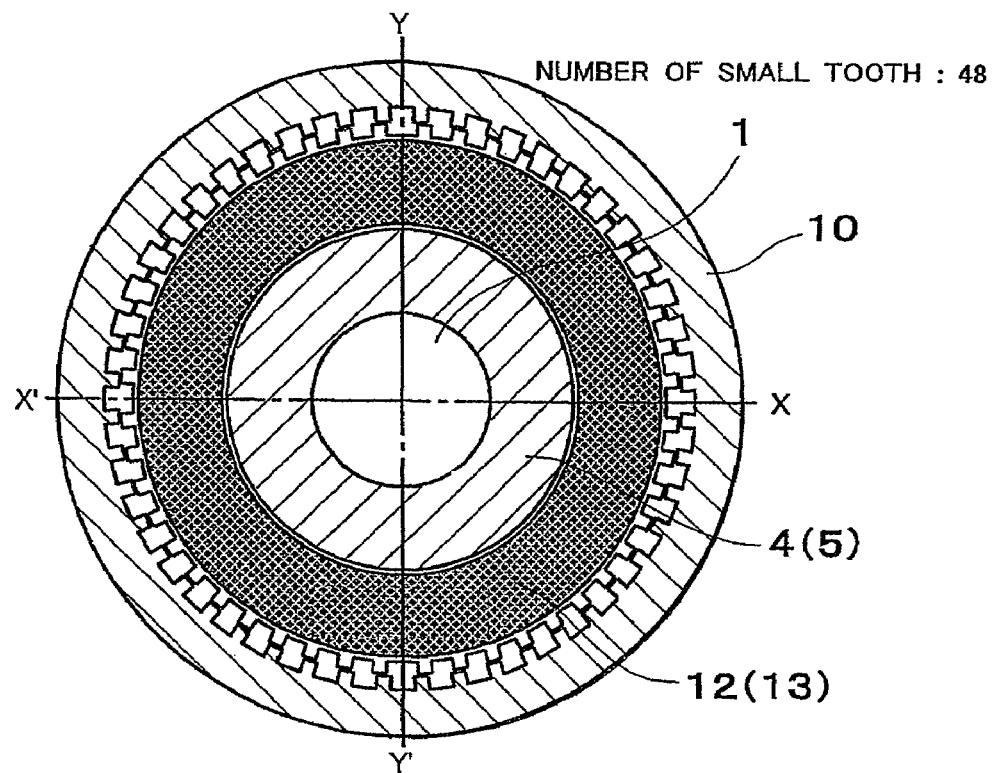
FIG. 20 is a vertically sectioned side view of a four-divided vernier pitch type motor according to the present invention.

20. In case of FIG. 20, a vernier pitch, which is the standard pitch 7.5°-360°/(4×48×12) is adopted.

(Embodiment of Inner Rotor Type Motor)

Figure 21:
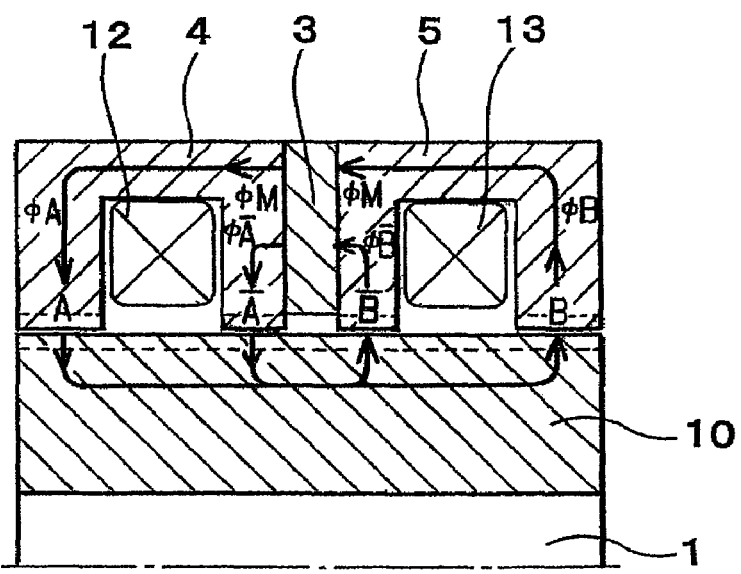
FIG. 21 is a vertically sectioned front view of a part of an inner rotor type two-phase hybrid stepping motor according to the present invention.
Figure 22:
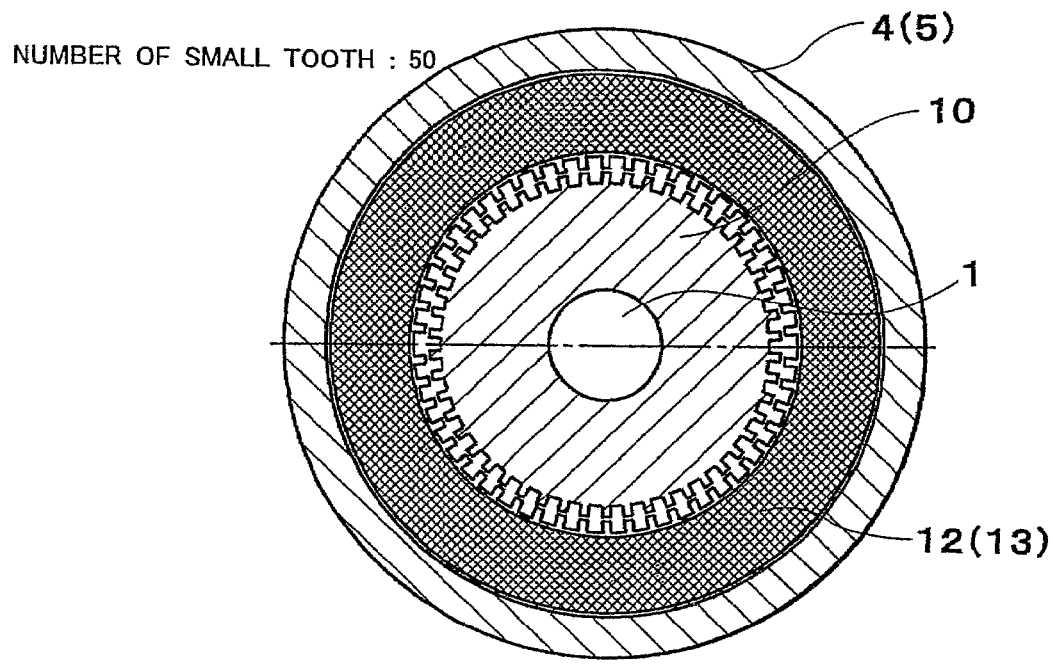
FIG. 22 is a vertically sectioned side view of the motor shown in FIG. 21.

The present invention can be applied on a motor having an inner rotor as shown in FIG. 21 and FIG. 22.

Figure 23:
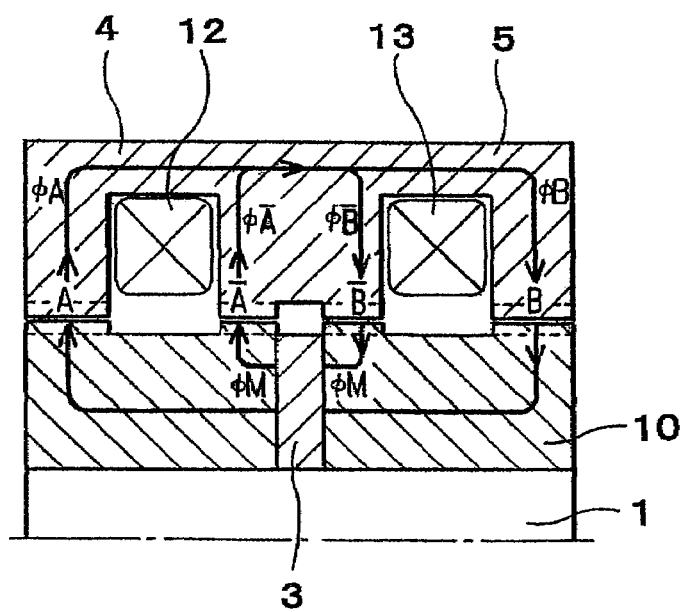
FIG. 23 is a vertically sectioned front view of a part of the other inner rotor type two-phase hybrid stepping motor according to the present invention.

In the motor shown in FIG. 21, a magnet is arranged outside of a rotor, so that a relatively strong magnetic flux is leaked to the outside of the motor. Accordingly, it is considered to arrange the magnet in the inner rotor as shown in FIG. 23. The magnetic paths are shown in FIG. 21 and FIG. 23. The equivalent magnetic circuit can be considered similar to the outer rotor motor.

(Effect of the Tooth Width Ratio at the Optimum Stack Ratio)

According to the magnetic field analysis, it is considered that the cogging torque becomes zero in case that the stack ratio is 1.6 ( the small teeth length of positive phase is 3.7 mm and the small teeth length of negative phase is 2.3 mm).

Figure 24:
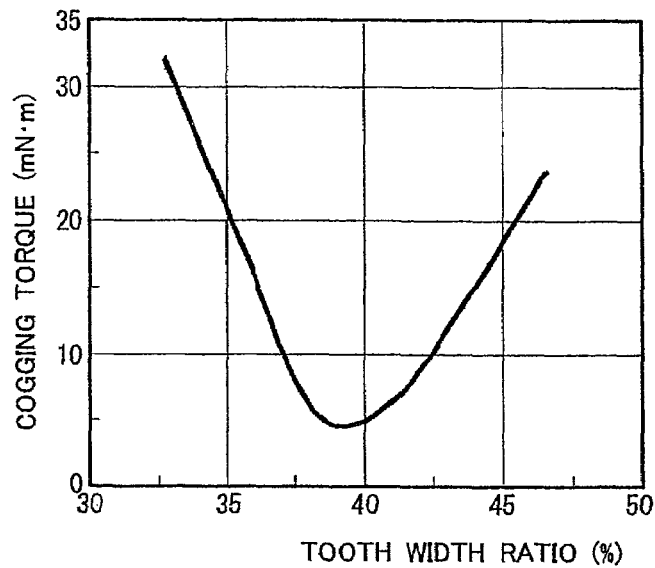
FIG. 24 is a diagram showing a relation between a ratio of tooth width and a cogging torque.

The relation of the tooth width and the cogging torque is shown in FIG. 24. In FIG. 24, the percentage of the tooth width is shown with respect to the normal tooth pitch of 1.83 mm different from FIG. 15, and the cogging torque becomes minimum in the range of tooth width of 35 to 45% of the normal tooth pitch.

FIG. 25 shows an electric circuit of a two-phase brushless motor according to the other embodiment of the present invention. In FIG. 25, reference numerals 12 and 13 denote windings of A and B phases of the motor, 20 denotes a power source, 23 and 24 denote Hall elements for detecting the magnetic pole positions, 21 denotes a control circuit for controlling electric current to the windings 12 and 13 according to the outputs of the Hall elements 23 and 24, 22 denotes a current adjusting circuit for the Hall elements 23 and 24, 25 to 28 and 29 to 32 denote power transistors, each forming a H bridge. The power transistors 25 and 28 are conducted at the same time so that an electric current flows into the winding 12 in the rightward direction, and the power transistors 26 and 27 are conducted at the same time so that an electric current flows into the winding 12 in the leftward direction.

The other power transistors 29 to 32 and the winding 13 are actuated similarly.

In the two-phase brushless motor as mentioned above, the number of the power transistor can be reduced to four, if the bifilar winding is used for each winding. It is preferable to reduce the magnetic pole pair number, that is, the number of small tooth is reduced compared with that in the normal hybrid type motor, in order to make easy the mounting precision of the Hall elements for detecting the rotor position.

The above brushless motor is simple in construction, low in cost, small in size, and high in torque, and can be used widely, because the control circuit is two-phase.

According to the stepping motor of the present invention, following effects can be obtained.

(1) It is possible to improve the permeance of the main magnetic flux path, and increase the counter electromotive force, torque and output, by using synthetic powder soft magnetic material, though a cylindrical winding of small turn number is used.

(2) It is possible to minimize the cogging torque without reducing the counter electromotive force, by selecting the stack ratio of the small teeth of two phases.

(3) It is possible to widen the freedom of design, and reduce the loss of the magnetic material due to the punching and the manufacturing cost, because the stator and the rotor can be made of the pressed powder soft magnetic material.

(4) The iron loss of the motor at the high speed rotation thereof can be reduced, so that the motor efficiency can be increased.

(5) The present invention can be applied to not only stepping motor, but also brushless motor, synchronous motor or generator.

(6) The cogging torque and the vibration of the motor can be reduced remarkably, because the numbers of rotor and stator small teeth are the same with each other, the small teeth of one of the motor and stator being arranged axisymmetrically with vernier pitch.

(7) The conventional motor shown in the Japanese Patent Application Laid-Open No. 12856/81, for example, is low in cost, because the winding can be carried out easily, however, the counter electromotive force, the output torque are small and the cogging torque is large, so that the utility is small. According to the present invention, however, the above defects can be obviated by using powder soft magnetic material.

(8) The multi-polar rotary machine of the present invention can be used widely for the office automation (OA) apparatus which require no vibration, or the full automation (FA) equipment which is operated at a high speed. The present invention can also be applied similarly to the inner rotor type motor, brushless motor, synchronous motor or generator.

While the invention has been particularly shown and described with reference to the preferred embodiments thereof, it will be understood by those skilled in the art that various changes in form and details may be made therein without departing from the spirit and scope of the invention as defined by the appended claims.

We claim:

1. A motor having shifted teeth of pressed powder construction, comprising:
an inner rotor; and
a cylindrical stator arranged concentrically with the rotor and with an air gap therebetween; said stator having two spaced stator elements and a ring shaped permanent magnet held between the stator elements and magnetized so as to form N and S poles in the axial direction of the stator, a plurality of small stator teeth A and $\overline{A}$ separated in the axial direction of the stator from each other and formed on the inner peripheral surface of one of the spaced stator elements, a plurality of small stator teeth $\overline{B}$ and B separated in the axial direction of the stator from each other and formed on the inner peripheral surface of the other of the spaced stator elements, and stator windings for A phase and B phase wound around the stator elements, respectively; said rotor having a plurality of small rotor teeth formed on the outer peripheral surface thereof similar in number to the small stator teeth, wherein each of said stator and said rotor is formed of pressed powder comprising a soft magnetic material and at least one of a resin and an inorganic material, and wherein said small rotor teeth are arranged axisymmetrically with vernier pitch, wherein a ratio of a thickness of the small stator teeth $\overline{A}$ in the axial direction of the stator to a thickness of the small stator teeth A in the axial direction of the stator is set to a value smaller than 1 so as to equalize substantially in mean permeance both small stator teeth A and $\overline{A}$ to each other, and wherein a ratio of a thickness of the small stator teeth $\overline{B}$ in the axial direction of the stator to a thickness of the small stator teeth B in the axial direction of the stator is set to a value smaller than 1 so as to equalize substantially in mean permeance both small stator teeth $\overline{A}$ and B to each other.

2. The motor having shifted teeth of pressed powder construction as claimed in claim 1, wherein said rotor and stator form a two-phase brushless motor.

3. A motor having shifted teeth of pressed powder construction, comprising:

an inner rotor; and a cylindrical stator arranged concentrically with the rotor and with an air gap therebetween; said stator having two spaced stator elements and a ring shaped permanent magnet held between the stator elements and magnetized so as to form N and S poles in the axial direction of the stator, a plurality of small stator teeth A and $\overline{A}$ separated in the axial direction of the stator from each other and formed on the inner peripheral surface of one of the spaced stator elements, a plurality of small stator teeth $\overline{B}$ and B separated in the axial direction of the stator from each other and formed on the inner peripheral surface of the other of the spaced stator elements, and stator windings for A phase and B phase wound around the stator elements, respectively; said rotor having a plurality of small rotor teeth formed on the outer peripheral surface thereof similar in number to the small stator teeth, wherein each of said stator and said rotor is formed of pressed powder comprising a soft magnetic material and at least one of a resin and an inorganic material, and wherein said small rotor teeth are arranged axisymmetrically with vernier pitch, wherein said ratio of thickness of the small stator teeth $\overline{A}$ or $\overline{B}$ in the axial direction of the stator to a thickness of the small stator teeth A or B in the axial direction is 0.5 to 0.8.

4. A motor having shifted teeth of pressed powder construction, comprising:

an inner rotor; and a cylindrical stator arranged concentrically with the rotor and with an air gap therebetween; said rotor having two spaced rotor elements and a ring shaped permanent magnet held between the rotor elements and magnetized so as to form N and S poles in the axial direction of the rotor; said stator having two spaced stator elements and a plurality of small stator teeth A and $\overline{A}$ separated in the axial direction of the stator from each other and formed on the inner peripheral surface of one of the spaced stator elements, a plurality of small stator teeth $\overline{B}$ and B separated in the axial direction of the stator from each other and formed on the inner peripheral surface of the other of the spaced stator elements, and stator windings for A phase and B phase wound around the stator elements, respectively; said rotor having a plurality of small rotor teeth formed on the outer peripheral surface thereof similar in number to the small stator teeth, wherein each of said stator and said rotor is formed of pressed powder comprising a soft magnetic material and at least one of a resin and an inorganic material, and wherein said small rotor teeth are arranged axisymmetrically with vernier pitch, wherein a ratio of a thickness of the small stator teeth $\overline{A}$ in the axial direction of the stator to a thickness of the small stator teeth A in the axial direction of the stator is set to a value smaller than 1 so as to equalize substantially in mean permeance both small stator teeth A and $\overline{A}$ to each other, and wherein a ratio of a thickness of the small stator teeth $\overline{B}$ in the axial direction of the stator to a thickness of the small stator teeth B in the axial direction of the stator is set to a value smaller than 1 so as to equalize substantially in mean permeance both small stator teeth $\overline{B}$ and B to each other.

5. The motor having shifted teeth of pressed powder construction as claimed in claim 4, wherein said ratio of thickness of the small stator teeth $\overline{A}$ or $\overline{B}$ in the axial direction of the stator to a thickness of the small stator teeth A or B in the axial direction is 0.5 to 0.8.

6. The motor having shifted teeth of pressed powder construction as claimed in claim 4, wherein a ratio of a stator tooth width to a rotor tooth width is set to 35% to 45% with respect to a standard small teeth pitch.

7. The motor having shifted teeth of pressed powder construction as claimed in claim 4, wherein said rotor and stator form a two-phase brushless motor.

* * * * *